(12) United States Patent
Xu

(10) Patent No.: US 11,815,726 B2
(45) Date of Patent: Nov. 14, 2023

(54) FIBER OPTIC CLOSURE TERMINALS WITH INCREASED VERSATILITY

(71) Applicant: Corning Incorporated, Corning, NY (US)

(72) Inventor: Qing Xu, Zhejiang (CN)

(73) Assignee: CORNING INCORPORATED, Corning, NY (US)

( * ) Notice: Subject to any disclaimer, the term of this patent is extended or adjusted under 35 U.S.C. 154(b) by 0 days.

(21) Appl. No.: 17/343,246

(22) Filed: Jun. 9, 2021

(65) Prior Publication Data

US 2021/0294053 A1    Sep. 23, 2021

Related U.S. Application Data

(63) Continuation of application No. 16/411,536, filed on May 14, 2019, now abandoned, which is a
(Continued)

(51) Int. Cl.
*G02B 6/44* (2006.01)
*G06N 20/00* (2019.01)
*G02B 6/50* (2006.01)

(52) U.S. Cl.
CPC ........... *G02B 6/445* (2013.01); *G02B 6/4454* (2013.01); *G02B 6/4477* (2013.01); *G02B 6/501* (2023.05)

(58) Field of Classification Search
CPC ...................................................... G02B 6/00
(Continued)

(56) References Cited

U.S. PATENT DOCUMENTS 5,596,670 A * 1/1997 Debortoli ............. G02B 6/4442
385/136
8,213,760 B2 * 7/2012 Rudenick ............. G02B 6/4455
385/134
(Continued)

FOREIGN PATENT DOCUMENTS

CN       101965531 A    2/2011
CN       201897654 U    7/2011
(Continued)

OTHER PUBLICATIONS

3M BPEO 1,5 Solutions@ Field, Communications Markets Division; 6 Pages (2013).
(Continued)

*Primary Examiner* — Kaveh C Kianni
(74) *Attorney, Agent, or Firm* — Tamika A. Crawl-Bey

(57) ABSTRACT

Embodiments of the disclosure are directed to fiber optic closure terminals with increased versatility. A fiber optic closure terminal is provided that includes a mount assembly for mounting at least one fiber optic module within a housing. The mount assembly includes a pivotable plate and a translatable plate configured to pivot the at least one fiber optic module greater than ninety degrees thereby providing better access to fiber management features at a bottom of the base of the fiber optic closure terminal. The improved access increases versatility by facilitating installation and/or maintenance of connecting a fiber optic cable to optical connections in the fiber optic module(s). The fiber optic closure terminal can also include a strain relief assembly configured for attachment and removal from the base of the housing for increased versatility regarding installation and/or maintenance of the fiber optic closure terminal.

17 Claims, 14 Drawing Sheets

Related U.S. Application Data continuation of application No. PCT/CN2017/084347, filed on May 15, 2017.

(58) Field of Classification Search
USPC .......................................................... 385/135
See application file for complete search history.

(56) References Cited

U.S. PATENT DOCUMENTS

| | | | | |
|---|---|---|---|---|
| 8,718,434 | B2* | 5/2014 | Gronvall | G02B 6/4471 |
| | | | | 385/139 |
| 9,106,981 | B2 | 8/2015 | Vastmans et al. | |
| 9,310,578 | B2 | 4/2016 | Vastmans et al. | |
| 9,513,451 | B2* | 12/2016 | Corbille | G02B 6/4494 |
| 9,557,504 | B2* | 1/2017 | Holmberg | G02B 6/4441 |
| 2004/0057676 | A1* | 3/2004 | Doss | G02B 6/3801 |
| | | | | 385/81 |
| 2004/0251220 | A1* | 12/2004 | Mertesdorf | G02B 6/4455 |
| | | | | 211/26 |
| 2005/0271344 | A1* | 12/2005 | Grubish | G02B 6/445 |
| | | | | 385/135 |
| 2007/0086721 | A1* | 4/2007 | Dobbins | G02B 6/445 |
| | | | | 385/134 |
| 2008/0124039 | A1* | 5/2008 | Gniadek | G02B 6/4453 |
| | | | | 385/135 |
| 2008/0166094 | A1* | 7/2008 | Bookbinder | G02B 6/0288 |
| | | | | 385/124 |
| 2009/0103879 | A1* | 4/2009 | Tang | G02B 6/4452 |
| | | | | 385/135 |
| 2009/0169163 | A1 | 7/2009 | Abbott et al. | |
| 2009/0257726 | A1* | 10/2009 | Redmann | H04Q 1/06 |
| | | | | 385/135 |
| 2009/0304342 | A1 | 12/2009 | Adomeit et al. | |
| 2010/0074587 | A1* | 3/2010 | Loeffelholz | G02B 6/4441 |
| | | | | 385/135 |
| 2012/0234778 | A1* | 9/2012 | Anderson | G02B 6/4452 |
| | | | | 211/26.2 |
| 2013/0170810 | A1* | 7/2013 | Badar | G02B 6/4471 |
| | | | | 385/135 |
| 2013/0209049 | A1* | 8/2013 | Kowalczyk | G02B 6/4457 |
| | | | | 385/135 |
| 2014/0219622 | A1* | 8/2014 | Coan | G02B 6/4441 |
| | | | | 29/428 |
| 2015/0153532 | A1* | 6/2015 | Holmberg | G02B 6/445 |
| | | | | 385/135 |
| 2017/0045701 | A1* | 2/2017 | Diepstraten | G02B 6/3897 |
| 2018/0131071 | A1* | 5/2018 | Anolik | H01Q 1/007 |
| 2019/0284612 | A1* | 9/2019 | Buse | G01N 35/04 |

FOREIGN PATENT DOCUMENTS

| | | |
|---|---|---|
| CN | 202351469 U | 7/2012 |
| CN | 202533627 U | 11/2012 |
| CN | 203133344 U | 8/2013 |
| CN | 203551860 U | 4/2014 |
| CN | 106371181 A* | 2/2017 |
| CN | 106377181 A | 2/2017 |
| CN | 206147157 U | 5/2017 |
| JP | 2008-076966 A | 4/2008 |
| WO | 2010/055451 A1 | 5/2010 |
| WO | 2018/090582 A1 | 5/2018 |

OTHER PUBLICATIONS

3M BPEO Size 1 For Fibre Distribution Point, Product Bulletin; 2 Pages: Downloaded Feb. 20. 2017.

Chinese Patent Application No. 201780080157.1, Office Action dated Feb. 19, 2021, 15 pages (9 pages of English Translation and 6 pages of Original Document); Chinese Patent Office.

English Translation of CN201780080157.1 Office Action Dated Jun. 2, 2020; 13 Pages; Chinese Patent Office.

EP17871431.7 Office Action dated Apr. 8, 2020; 8 Pages; European Patent Office.

Extended European Search Report and Search Opinion; 17871431. 7; dated Apr. 8, 2020; 8 pages; European Patent Office.

GPJ09-8205 Fiber Optic Splice Closure: Instruction Manual; 13 Pages; Downloaded Feb. 20, 2017.

GPJ09-8205 Splice Closure Technical Specification; 3 Pages; Downloaded Feb. 20, 2017.

International Preliminary Report On Patentability of the International Searching Authority; PCT/CN2017/084347; dated May 31, 2019; 6 Pages; State Intellectual Property Office of the P.R.China.

International Search Report and Written Opinion of the International Searching Authority; PCT/CN2017/084347; dated Feb. 26, 2018; 9 Pages; State Intellectual Property Office of the P.R.China.

* cited by examiner

FIBER OPTIC CLOSURE TERMINALS WITH INCREASED VERSATILITY

PRIORITY APPLICATION

This application is a continuation of U.S. patent application Ser. No. 16/411,536, filed May 14, 2019, which is a continuation of International Application No. PCT/CN2017/084347, filed May 15, 2017, the contents of which are relied upon and incorporated herein by reference in their entireties.

BACKGROUND

The disclosure relates to fiber optic equipment, and in particular, to a fiber optic closure terminal serving as a junction point in a fiber optic network.

To improve network performance, communication and data networks are increasingly employing optical fiber. The benefits of optical fiber are well known and include higher signal-to-noise ratios and increased bandwidth. To further improve network performance, fiber optic networks are increasingly providing optical fiber connectivity all the way to end subscribers. These initiatives include various fiber-to-the-premises (FTTP), fiber-to-the-home (FTTH), and other fiber initiatives (generally described as FTTx). A fiber optic network provides optical signals over a distribution network comprised of fiber optic cables. Optical signals may be carried over fiber optic cables to end subscribers via a fiber optic closure terminal. A fiber optic closure terminal, as used herein, is a device used in fiber optic distribution networks that provides a network access point in FTTx applications.

Fiber optic closure terminals include an enclosure or housing that houses fiber management features and includes a plurality of ports for allowing convenient connection and disconnection of distribution fibers to subscriber side fibers to connect and disconnect data services to subscribers. These fiber optic closure terminals may also provide the ability to add incremental subscribers by one or more drop ports. Fiber optic closure terminals may be designed to have a small size and footprint, thereby requiring compact internal layout and design of various fiber optic features.

Deployment and/or maintenance of fiber optic closure terminals, such as by connecting fiber optic cables to one or more drop ports, may require on site fiber optic cable connection and/or installation with the fiber optic closure terminal, which may be difficult, cumbersome, and/or time consuming. Further, such deployment and/or maintenance may require operators to move internal components within the fiber optic terminal to access different interior areas and/or fiber management features within the fiber optic closure terminals, which may also be difficult, cumbersome, and/or time consuming.

Accordingly, there is a desire to increase the versatility of a fiber optic closure terminal to facilitate installation and maintenance of the fiber optic closure terminal.

SUMMARY

Embodiments of the disclosure are directed to fiber optic closure terminals with increased versatility. In exemplary embodiments, a fiber optic closure terminal is provided that includes a housing and a mount assembly for mounting at least one fiber optic module within the housing. The housing includes a base and a cover pivotably attached to the base. The mount assembly includes a pivotable plate and a translatable plate configured to pivot the at least one fiber optic module greater than ninety degrees thereby providing better access to fiber management features at a bottom of the base of the fiber optic closure terminal. The improved access increases versatility by facilitating installation and/or maintenance of connecting a fiber optic cable to optical connections in the fiber optic module(s). In exemplary embodiments, the fiber optic closure terminal can also include a strain relief assembly for a fiber optic cable. The strain relief assembly is configured for attachment and removal from the base of the housing for increased versatility regarding installation and/or maintenance of connecting a fiber optic cable to optical connections in the fiber optic module(s). The strain relief assembly includes a first strain relief support and a second strain relief support translatable relative to one another, which together define an adjustable aperture configured to receive different sized fiber optic cables for increased versatility.

One embodiment of the disclosure relates to a fiber optic closure terminal, comprising a housing, a mount assembly, and a fiber optic module. The housing defines an interior and comprises a base and a cover pivotably attached to the base. The cover is configured to pivot between a first closed position relative to the base and a first open position relative to the base. The mount assembly is positioned within the interior of the housing. The mount assembly comprises a pivotable plate and a translatable plate. The pivotable plate is pivotally attached to the base of the housing. The pivotable plate is configured to pivot between a second closed position relative to the base and a second open position relative to the base. The translatable plate is translatably attached to the pivotable plate. The translatable plate is configured to translate between a third closed position relative to the pivotable plate and a third open position relative to the pivotable plate. The fiber optic module is fixedly mounted to the translatable plate. The fiber optic module is configured to rotate from an initial position relative to the base to a rotated position relative to the base greater than ninety degrees from the initial position when the translatable plate is translated to the third open position.

An additional embodiment of the disclosure relates to a fiber optic closure terminal comprising a housing, a fiber optic module, and a strain relief assembly. The housing defines an interior and comprises a base and a cover movably attached to the base. The base defines a port and a receptacle proximate the port. The fiber optic module is positioned within the interior of the housing. The fiber optic module is configured to facilitate optical connection with a fiber optic cable. The strain relief assembly is removably positioned within the receptacle of the base. The strain relief assembly comprises a first strain relief support and a second strain relief support movably attached to the first strain relief support. The first strain relief support and the second strain relief support define an aperture. The aperture is adjustable by moving the first strain relief support relative to the second strain relief support. The strain relief assembly is configured to secure the fiber optic cable within the aperture. When the strain relief assembly secures the fiber optic cable within the aperture, the strain relief assembly is configured to remain secured to the fiber optic cable when the strain relief assembly is removed from the receptacle, and the strain relief assembly is configured to remain secured to the fiber optic cable when the strain relief assembly is inserted into the receptacle.

An additional embodiment of the disclosure relates to a method of manufacturing a fiber optic closure terminal, comprising pivotably attaching a cover of a housing to a base of the housing. The cover is configured to pivot between a first closed position relative to the base and a first open position relative to the base. The method further comprises pivotably attaching a pivotable plate of a mount assembly to the base of the housing. The pivotable plate is configured to pivot between a second closed position relative to the base and a second open position relative to the base. The method further comprises translatably attaching a translatable plate of the mount assembly to the pivotable plate. The translatable plate is configured to translate between a third closed position relative to the pivotable plate and a third open position relative to the pivotable plate. The method further comprises attaching a fiber optic module to the translatable plate of the mount assembly. The fiber optic module is configured to rotate from an initial position relative to the base to a rotated position relative to the base greater than ninety degrees from the initial position when the translatable plate is translated to the third open position. The method further comprises pivoting the cover of the housing from the first open position to the first closed position to enclose the mount assembly and the fiber optic module within an interior of the housing.

An additional embodiment of the disclosure relates to a method of manufacturing a fiber optic closure terminal, comprising positioning a fiber optic cable within an aperture of a strain relief assembly. The aperture is defined by a first strain relief support and a second strain relief support of the strain relief assembly. The method further comprises translating the second strain relief support relative to the first strain relief support to adjust the aperture to secure the fiber optic cable within the aperture. The method further comprises positioning the fiber optic cable in a port of a base of a housing. The method further comprises positioning the strain relief assembly in a receptacle of the base of the housing. The receptacle is proximate the port. The method further comprises moving a cover of the housing relative to the base of the housing to enclose a fiber optic module within an interior of the housing. The fiber optic module is in optical communication with the fiber optic cable.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate one or more embodiments, and together with the description serve to explain principles and operation of the various embodiments.

DETAILED DESCRIPTION

Embodiments of the disclosure are directed to fiber optic closure terminals with increased versatility. In exemplary embodiments, a fiber optic closure terminal is provided that includes a housing and a mount assembly for mounting at least one fiber optic module within the housing. The housing includes a base and a cover pivotably attached to the base. The mount assembly includes a pivotable plate and a translatable plate configured to pivot the at least one fiber optic module greater than ninety degrees thereby providing better access to fiber management features at a bottom of the base of the fiber optic closure terminal. The improved access increases versatility by facilitating installation and/or maintenance of connecting a fiber optic cable to optical connections in the fiber optic module(s). In exemplary embodiments, the fiber optic closure terminal can also include a strain relief assembly for a fiber optic cable. The strain relief assembly is configured for attachment and removal from the base of the housing for increased versatility regarding installation and/or maintenance of connecting a fiber optic cable to optical connections in the fiber optic module(s). The strain relief assembly includes a first strain relief support and a second strain relief support translatable relative to one another, which together define an adjustable aperture configured to receive different sized fiber optic cables for increased versatility.

Figure 1:
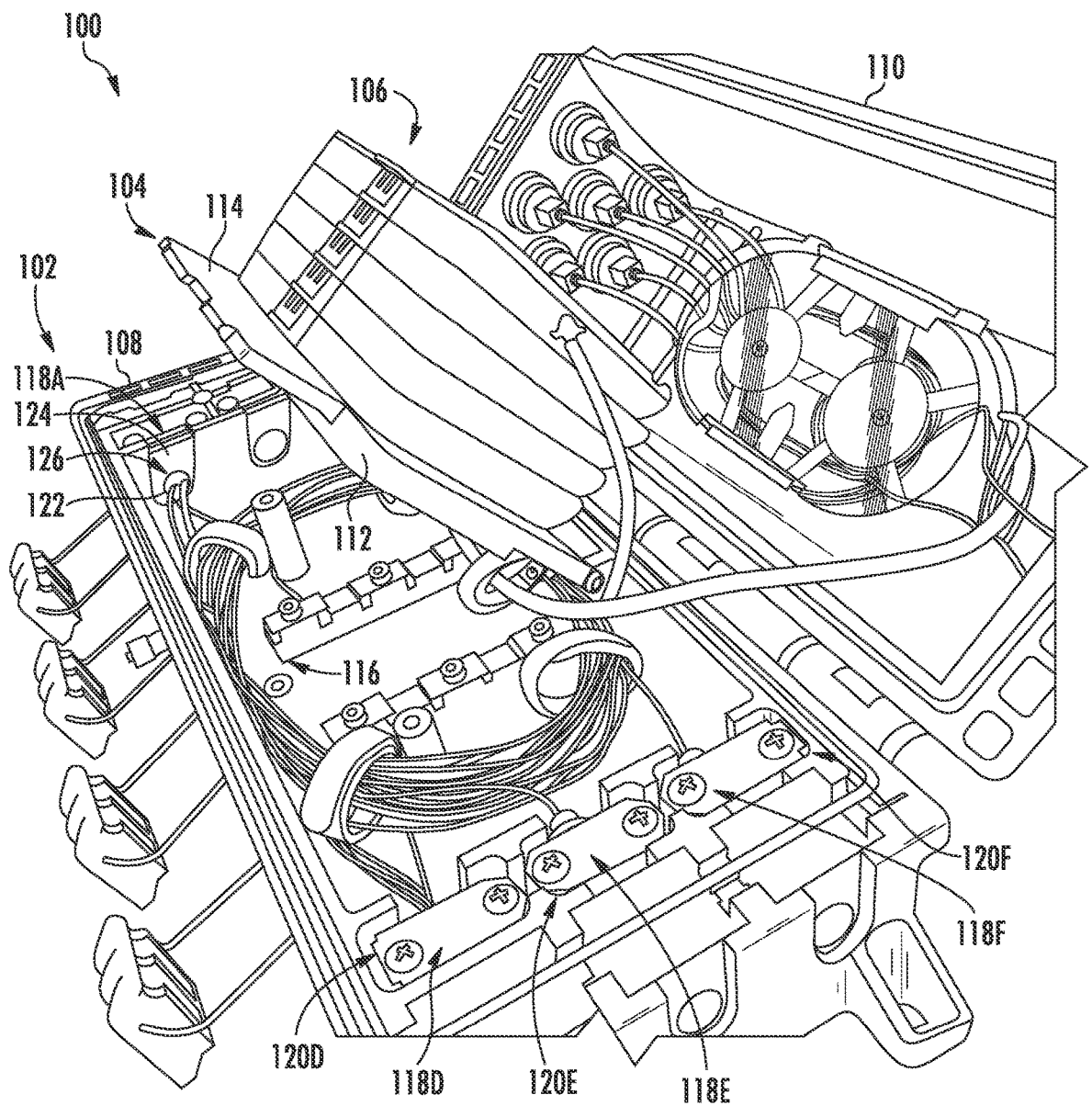
FIG. 1 is a perspective view of an exemplary fiber optic closure terminal.

FIG. 1 is a perspective view of an exemplary fiber optic closure terminal 100. As will be discussed below, the fiber optic closure terminal 100 includes certain features to support increased versatility. The fiber optic closure terminal 100 includes a housing 102 and a mount assembly 104 for mounting at least one fiber optic module 106 within the housing 102. As used herein, a fiber optic module 106 includes a closed housing (e.g., made of plastic and/or metal, etc.) with one or more fiber optic cables (e.g., ribbons) positioned within the housing. The housing 102 includes a base 108 and a cover 110 pivotably attached to the base 108. As will be discussed in more detail below, the mount assembly 104 includes a pivotable plate 112 and a translatable plate 114 configured to pivot the at least one fiber optic module 106 greater than ninety degrees thereby providing better access to fiber management features 116 at a bottom of the base 108 of the fiber optic closure terminal 100. The improved access increases versatility by facilitating installation and/or maintenance of the fiber optic closure terminal 100. The improved access increases versatility of the fiber optic closure terminal 100 by facilitating installation and/or maintenance of connecting a fiber optic cable to optical connections in the fiber optic module(s) 106. As will also be discussed in more detail below, the fiber optic closure terminal 100 in this example also includes a removable strain relief assembly (such as one of the strain relief assemblies 118A-118F) for a fiber optic cable (not shown) which is configured for attachment and removal from a receptacle (such as one of the receptacles 120A-120F) of the base 108 of the housing 102 for increased versatility regarding installation and/or maintenance of connecting a fiber optic cable to optical connections in the fiber optic module(s) 106 The removable strain relief assembly 118A-118F includes a first strain relief support 122 and a second strain relief support 124 translatable relative to one another, which together define an adjustable aperture 126 configured to receive different sized fiber optic cables for increased versatility.

Figure 2A:
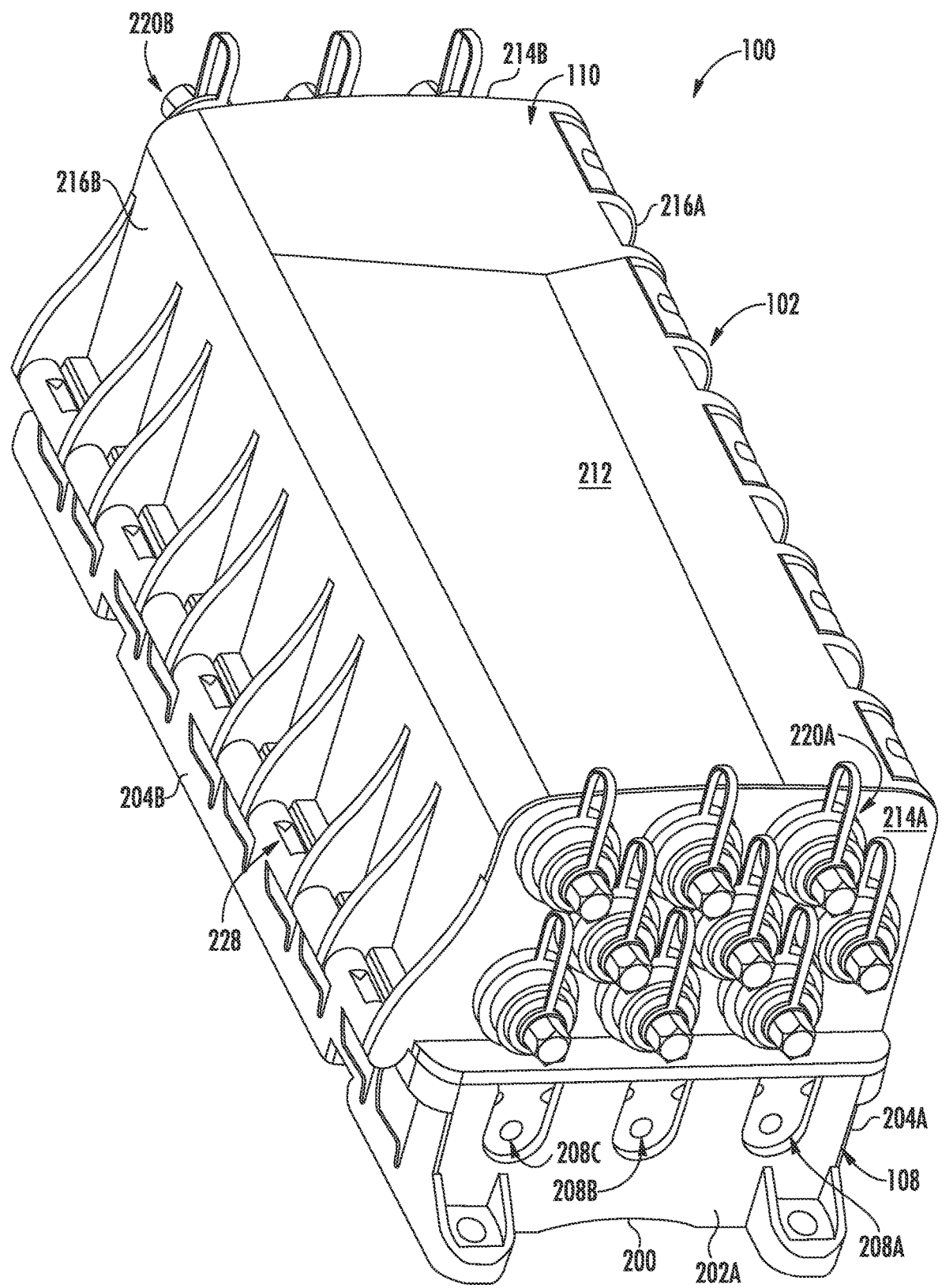
FIG. 2A is a perspective view of a housing of the exemplary fiber optic closure terminal of FIG. 1 with a cover in a closed position.
Figure 2B:
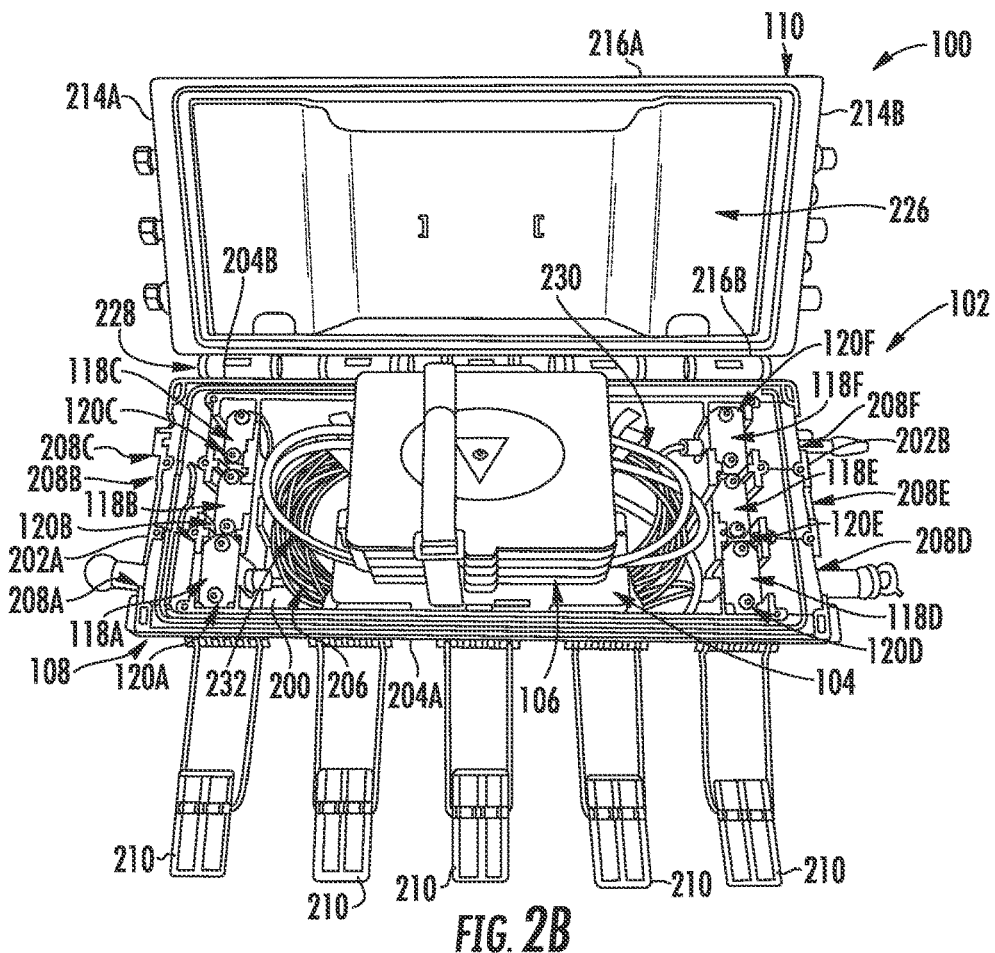
FIG. 2B is a perspective view of the exemplary fiber optic closure terminal of FIGS. 1 and 2A with the cover in an open position.
Figure 2C:
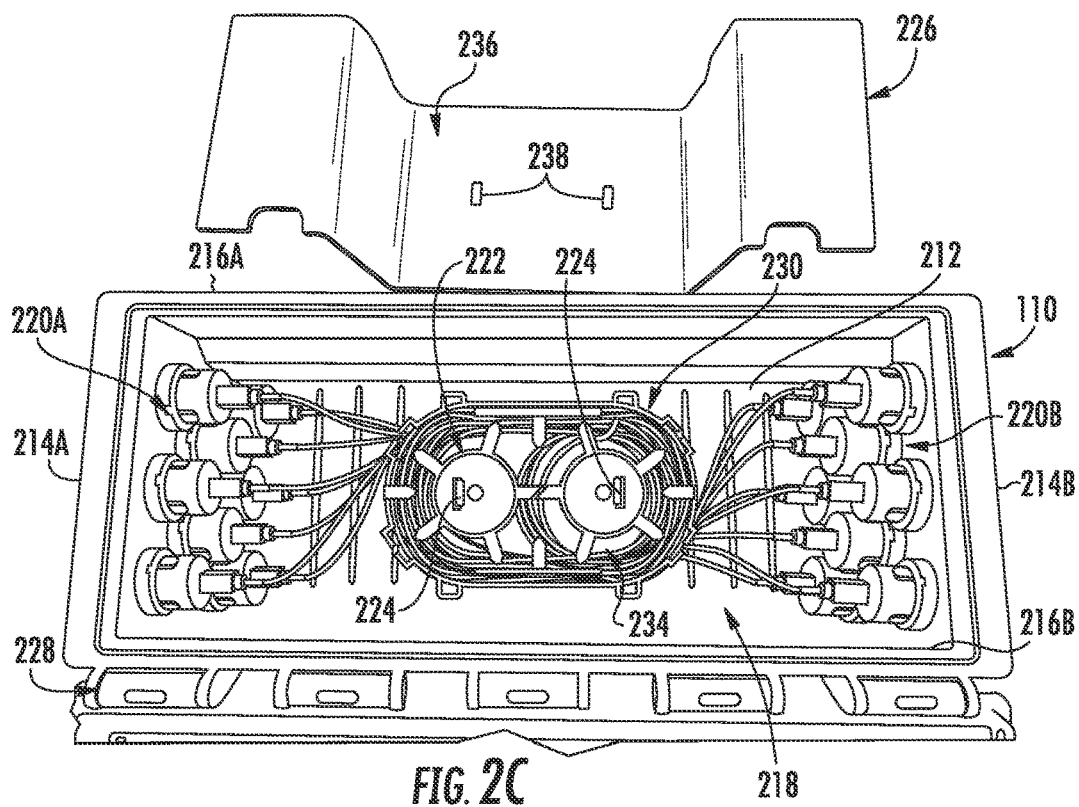
FIG. 2C is a perspective view of the cover of the exemplary fiber optic closure terminal of FIG. 2A with an insert divider removed from the cover.

FIGS. 2A-2C are views of the exemplary fiber optic closure terminal 100 of FIG. 1. The fiber optic closure terminal 100 (also referred to as a universal closure access for optical fibers, universal closure access for optical cables, fiber optic splice organizer, splice closure, terminal closure, terminal box, etc.) could be used in any of a number of different applications, such as FTTx applications, including fiber-to-the-home (FTTH), fiber-to-the-premise (FTTP), etc. The fiber optic closure terminal 100 is configured to be installed as new infrastructure, or to fit into preexisting infrastructure. The fiber optic closure terminal 100 may be connectorized or pre-connectorized (also referred to as stubbed). It is noted that a pre-connectorized fiber optic closure terminal 100 decreases installation time and overall operational expenses. In certain embodiments, the fiber optic closure terminal 100 splits a fiber optic cable from a network (also referred to as an office side fiber optic cable) into several fiber optic cables to a subscriber (also referred to as a subscriber fiber optic cable), where an end of the subscriber fiber optic cable is connected to a subscriber premise. The fiber optic closure terminal 100 could be configured for hardened single or multifiber connectivity.

As noted above, the fiber optic closure terminal 100 includes a mount assembly 104 discussed in more detail in FIGS. 3A-4D and a removable strain relief assembly 118A-118F discussed in more detail in FIGS. 5A-6E.

The housing 102 of the fiber optic closure terminal 100 allows fiber optic cables, fiber optic connections, fiber optic equipment, and/or fiber optic management features to be housed within the housing 102 to secure such components therein and protect such components from environmental contamination (e.g., dust, water, etc.). The housing 102 could be made of plastic and/or metal, etc. The housing 102 could be configured for a variety of desired sealing requirements, such as those of the Ingress Protection (IP) ratings (also known as the International Protection ratings), which define different levels of sealing effectiveness against intrusion from foreign bodies (e.g., dirt, dust, water, etc.). The IP ratings are published by the International Electrotechnical Commission (IEC), which is an international standards organization that prepares and publishes international standards for electrical, electronic, and related technologies. In particular, the IP ratings indicate the level of protection for solids (the first digit) and liquids (the second digit). For solids, the IP ratings include the following levels indicating the object size protected against: Level 0 (not protected), Level 1 (>50 mm), Level 2 (>12.5 mm), Level 3 (>2.5 mm), Level 4 (>1 mm), Level 5 (dust protected), and Level 6 (dust tight). For liquids, the IP ratings include the following levels indicating the object size protected against: Level 0 (not protected), Level 1 (dripping water), Level 2 (dripping water when tilted up to 15°), Level 3 (spraying water), Level 4 (splashing water), Level 5 (water jets), Level 6 (powerful water jets), Level 7 (immersion up to 1 m), and Level 8 (immersion beyond 1 m). The fiber optic closure terminal 100 can achieve a rating of IP 68. Accordingly, the fiber optic closure terminal 100 can be located on a street or underground. In particular, the fiber optic closure terminal 100 can be configured for a variety of mounting configurations, such as aerial (e.g., pole, hanging, etc.), façade (e.g., wall), underground (e.g., in chamber, direct buried, etc.). Further, the fiber optic closure terminal 100 could be configured as a variety of types of closures (e.g., inline, butt, dome, etc.) and a variety of sizes (e.g., 365 mm length, 150 mm height, 160 mm width, etc.).

As discussed above, the fiber optic closure terminal 100 includes the base 108 and the cover 110 pivotally attached to the base 108. The cover 110 pivots between a first position (also referred to herein as a closed position), shown in FIG. 2A, and a second position (also referred to herein as an open position), shown in FIGS. 2B and 2C. The base 108 includes a bottom wall 200, a left wall 202A extending from a left side of the bottom wall 200, a right wall 202B extending from a right side of the bottom wall 200 (opposite the left wall 202A), a front wall 204A extending from a front side of the bottom wall 200, and a back wall 204B extending from a back side of the bottom wall 200 (opposite the front wall 204A). The base 108, and the walls 200, 202A, 202B, 204A, 204B, define a base interior 206.

The left wall 202A of the base 108 of the fiber optic closure terminal 100 in FIG. 1 defines a plurality of feeder ports 208A-208C. The right wall 202B of the base 108 defines a plurality of feeder ports 208D-208F. The feeder ports 208A-208F (also referred to as cable ports, distribution ports, etc.) are apertures and/or connectors in the base 108 configured to receive and/or connect a fiber optic feeder cable. The fiber optic feeder cable could be a variety of sizes (e.g., 2 mm-18 mm diameter, etc.). The feeder ports 208A-208F are each configured to receive at least a portion of a fiber optic cable (such as a feeder fiber optic cable), as explained in more detail below. In particular, the left wall 202A includes a first feeder port 208A, a second feeder port 208B, and a third feeder port 208C, where the first feeder port 208A is positioned towards the front wall 204A, the third feeder port 208C is positioned towards the back wall 204B, and the second feeder port 208B is positioned in-between the first feeder port 208A and the third feeder port 208C. The right wall 202B includes a fourth feeder port 208D, a fifth feeder port 208E, and a sixth feeder port 208F, where the fourth feeder port 208D is positioned towards the front wall 204A, the sixth feeder port 208F is positioned towards the back wall 204B, and the fifth feeder port 208E is positioned in between the fourth feeder port 208D and the sixth feeder port 208F. In this way, the first and fourth feeder ports 208A, 208D of the left and right walls 202A, 202B are positioned opposite from one another, the second and fifth feeder ports 208B, 208E of the left and right walls 202A, 202B are positioned opposite from one another, and the third and sixth feeder ports 208C, 208F of the left and right walls 202A, 202B are positioned opposite from one another.

The front wall 204A of the base 108 includes a plurality of clasps 210 (e.g., five clasps 210) extending between the left and right walls 202A, 202B. The clasps 210 are configured to attach to and detach from the cover 110 to secure the cover 110 to the base 108 in a closed position.

The cover 110 includes a top wall 212, a left wall 214A extending from a left side of the top wall 212, a right wall 214B extending from a right side of the top wall 212 (opposite the left wall 214A), a front wall 216A extending from a front side of the top wall 212, and a back wall 216B extending from a back side of the top wall 212 (opposite the front wall 216A). The cover 110 (and in particular, the walls 212, 214A, 214B, 216A, 216B) define a cover interior 218. The left wall 214A includes a plurality of drop ports 220A and the right wall 214B includes a plurality of drop ports 220B. The drop ports 214A, 214B are apertures and/or connectors in the housing 102 to receive and/or connect fiber optic drop cables. In particular, the left wall 214A includes eight drop ports 220A, and the right wall 214B includes eight drop ports 220B (for a total of sixteen drop ports 220A, 220B). An interior surface of the cover 110 includes a cable storage feature 222 to store cabling, which includes engagement prongs 224 to engage an insert divider 226, as discussed in more detail below.

The housing 102 further includes a hinge 228 pivotally attaching the back wall 204B of the base 108 to the back wall 216B of the cover 110. Accordingly, the cover 110 can pivot relative to the base 108 to selectively enclose an interior (interiors 206, 218) of the housing 102.

The fiber optic closure terminal 100 includes fiber optic equipment 230 contained within the housing 102 of the fiber optic closure terminal 100. The fiber optic equipment 230 includes the at least one fiber optic module 106 mounted to the mount assembly 104, as explained in more detail below. Further, the fiber optic equipment 230 includes first cabling 232 (also referred to as bottom cabling) positioned within an interior of the cover 110 and second cabling 234 (also referred to as top cabling) positioned within the base 108. The top cabling 234 is in fiber optic communication with the drop ports 220A, 220B of the cover 110. The drop ports 220A, 220B could be configured to receive a fiber optic cable of a variety of sizes (e.g., 2 mm-18 mm diameter, etc.).

The slack of the top cabling 234 is positioned around the cable storage feature 222 of the cover 110. The bottom cabling 232 is in fiber optic communication with the plurality of feeder ports 208A-208F of the base 108. The bottom cabling 232 may provide six feet or more of slack storage.

The fiber optic closure terminal 100 further includes the insert divider 226 to separate the at least one fiber optic module 106 from the top cabling 234 and/or drop ports 220A, 220B of the cover 110. The insert divider 226 defines a recessed interior 236 configured to receive at least a portion of the at least one fiber optic module 106 of the fiber optic equipment 230 when the cover 110 is in a closed position relative to the base 108. Further, the insert divider 226 includes a plurality of slots 238 configured to receive the engagement prongs 224 of the cable storage feature 222 of the top wall 212 of the cover 110. The engagement prongs 224 are biased to engage the slots 238 to attach the insert divider 226 to the cover 110 so that the insert divider 226 moves with the cover 110 when the cover 110 is moved between open and closed positions relative to the base 108.

Figure 3A:
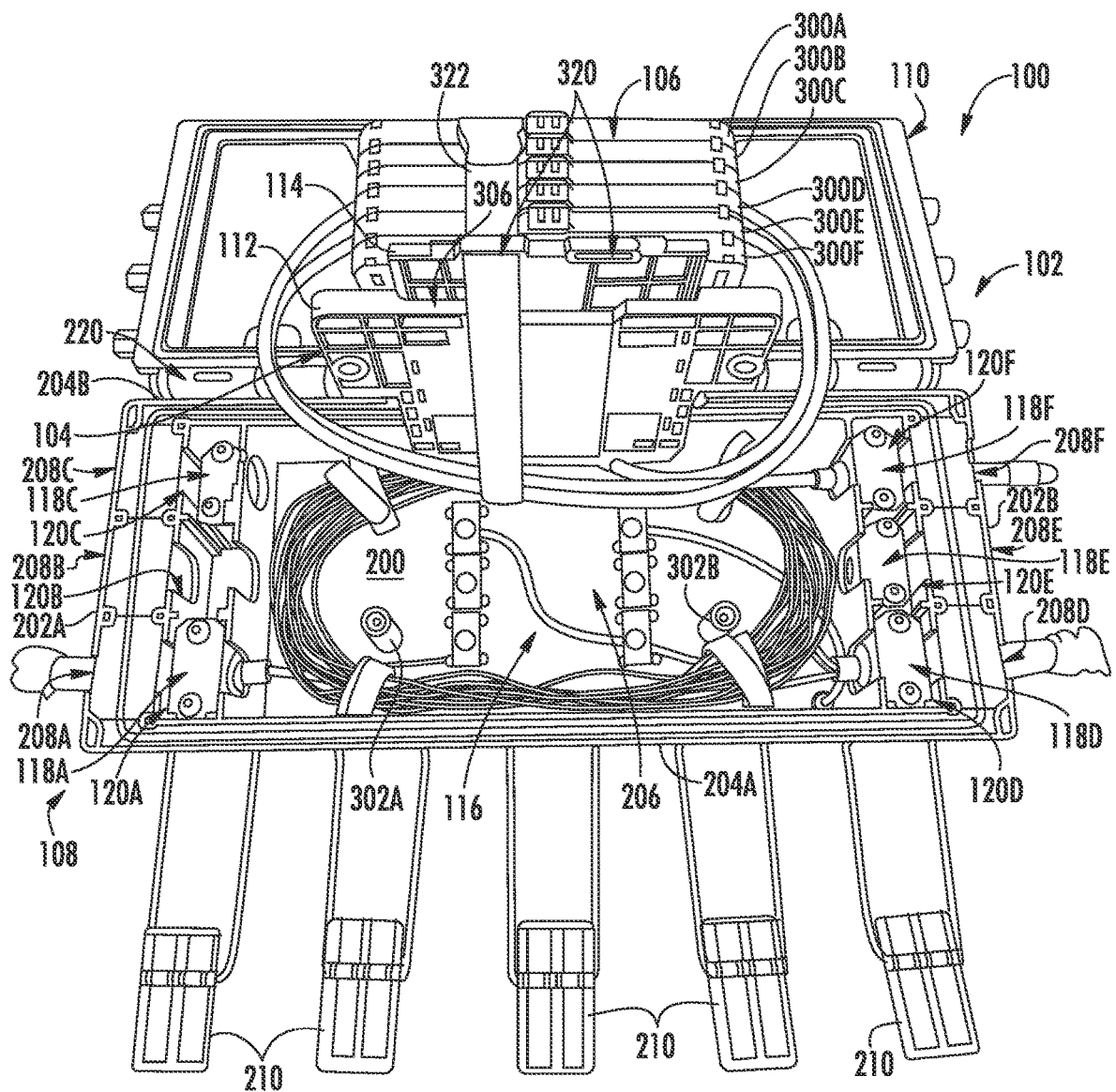
FIG. 3A is a top view of the exemplary fiber optic closure terminal of FIGS. 1-2C with a mount assembly in an open position.
Figure 3B:
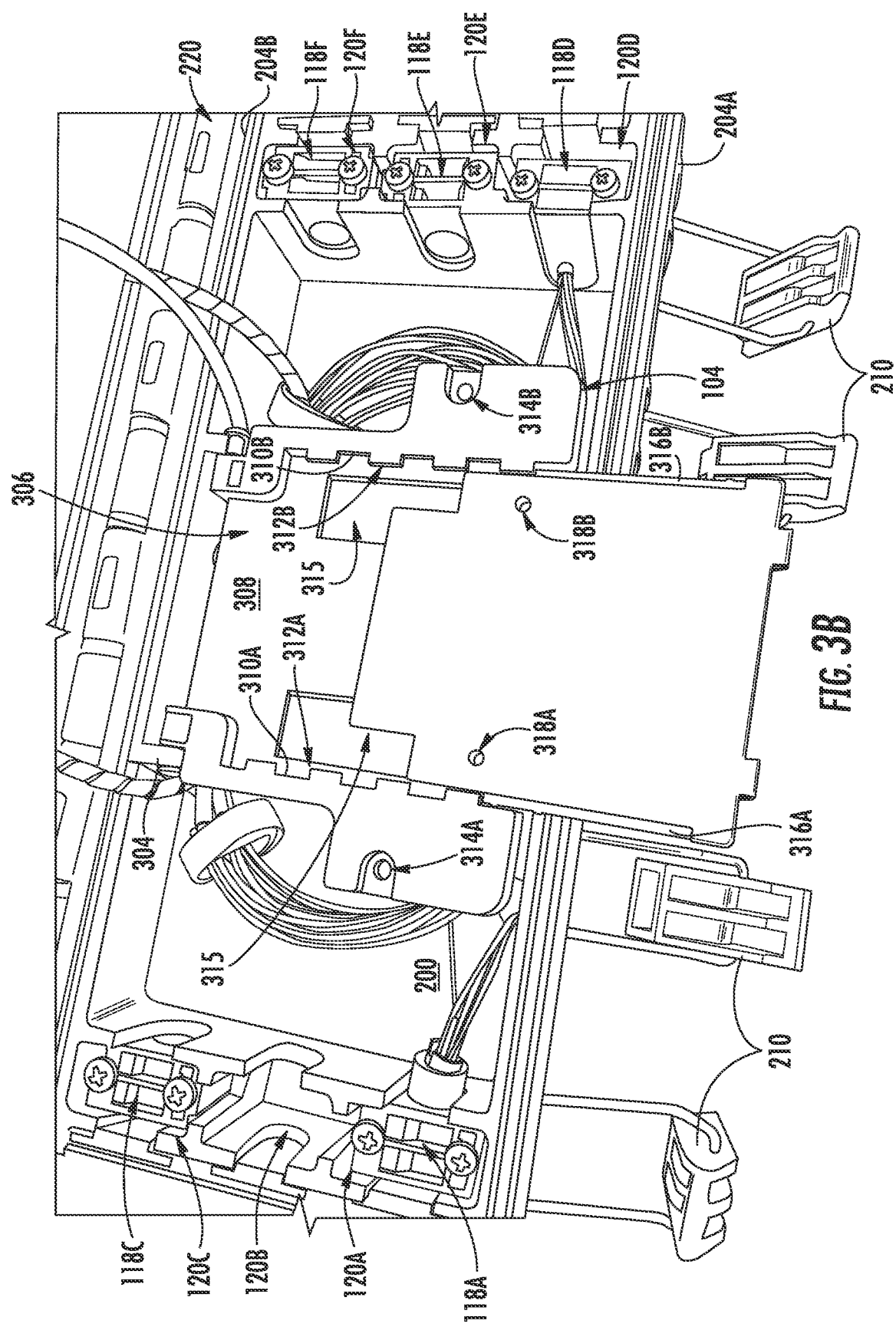
FIG. 3B is a top view of the mount assembly of the exemplary fiber optic closure terminal of FIG. 3A with a translatable plate in an open position.

FIGS. 3A and 3B are views of the mount assembly 104 of the fiber optic closure terminal 100 of FIGS. 1-2C. As discussed above, the mount assembly 104 is configured to mount the at least one fiber optic module 106 within the fiber optic closure terminal 100. The at least one fiber optic module 106 comprises a plurality of stacked (e.g., vertically stacked) fiber optic splice trays 300A-300F to split a fiber optic network cable to multiple fiber optic subscriber cables. In particular the fiber optic splice trays 300A-300F include housings where fiber optic cables begin and/or end. Each fiber optic splice tray 300A-300F may include 36 single-fiber splices or 144 ribbons. The fiber optic splice trays 300A-300F in optical communication with feeder ports 208A-208F of the base 108 via bottom cabling 232 and/or in optical communication with drop ports 220A, 220B of the cover 110 via top cabling 234.

The mount assembly 104 includes the pivotable plate 112 pivotally mounted to the back wall 204B of the base 108 at a top of the back wall 204B by a hinge 304. The pivotable plate 112 of the mount assembly 104 pivots between a closed position and an open position to provide selective access to a bottom of the base 108 (and the fiber management features 116 located therein). The bottom wall 200 of the base 108 includes a first post 302A (also referred to as a left post, left column, left cylinder, left cylindrical column, etc.) and a second post 302B (also referred to as a right post, right column, right cylinder, right cylindrical column, etc.) to contact the pivotable plate 112 of the mount assembly 104 when the pivotable plate 112 is in a closed position. The height of the left and right posts 302A, 302B relative to the bottom wall 200 of the base 108 is approximately the same as the height of the hinge 304 relative to the bottom wall 200 of the base 108. Accordingly, in a closed position, the pivotable plate 112 is level (also referred to as parallel) relative to the bottom wall 200 of the base 108. A back of the pivotable plate 112 is supported by the hinge 304, and a front of the pivotable plate 112 is supported by the left and right posts 302A, 302B. However, fewer or more posts 302A, 302B could be used.

The pivotable plate 112 includes a recessed channel 306 (also referred to as an open channel) extending from a front of the pivotable plate 112 to receive the translatable plate 114 therein. The recessed channel 306 includes a bottom wall 308, a first sidewall 310A (also referred to as a left sidewall) and a second sidewall 310B (also referred to as a right sidewall) opposite the left sidewall 310A. The left sidewall 310A includes a first side track 312A (also referred to as a left side track) and the right sidewall 312B includes a second side track 312B (also referred to as a right side track). Tracks comprise guides or grooves to receive a rail therein for translation of the rail within the track. The left and right side tracks 312A, 312B of the pivotable plate 112 interact with the translatable plate 114 to slidably mount the translatable plate 114 to the pivotable plate 112.

A bottom surface of the pivotable plate 112 includes a first post hole 314A (also referred to as a left post hole) and a second post hole 314B (also referred to as a right post hole). It is noted that, as used herein, hole includes any sized or shaped aperture, cavity, etc. The left post hole 314A is configured to align with a top of the left post 302A of the bottom wall 200 of the base 108 when the pivotable plate 112 is in a closed position. The right post hole 314B is configured to align with a top of the right post 302B of the bottom wall 200 of the base 108 when the pivotable plate 112 is in a closed position. Accordingly, a screw or other fastener can be used to mount the pivotable plate 112 to the left and right posts 302A, 302B. Further, the pivotable plate 112 further includes one or more retaining channels 315 to prevent the translatable plate 114 from becoming disengaged with the pivotable plate 112, as explained in more detail below.

The translatable plate 114 is configured to translate (also referred to as linearly translate, linearly move, etc.) relative to the pivotable plate 112 to allow the pivotable plate 112 to rotate more than ninety degrees (e.g., 100 degrees, 110 degrees, 120 degrees, 150 degrees, 180 degrees, 190 degrees, etc.) from the original closed position to provide increased access to a bottom of the housing 102. By translating forwarding, the fiber optic module 106 mounted to the translatable plate 114 is also translated forward and away from the back wall 204B and/or hinge 228, thereby providing clearance for the fiber optic modules 106 to rotate over the back wall 204B and/or hinge 228 more than ninety degrees. The translatable plate 114 includes a first side rail 316A (e.g., left side rail) along a left side of the translatable plate 114 (extending between a front and back of the translatable plate 114), and a second side rail 316B (e.g., right side rail) along a right side of the translatable plate 114 (extending between a front and back of the translatable plate 114). The left and right side rails 316A, 316B of the translatable plate 114 engage the left and right side tracks 312A, 312B of the pivotable plate 112 to slidably attach the translatable plate 114 to the pivotable plate 112. In other words, the left and right side rails 316A, 316B of the translatable plate 114 engage the left and right side tracks 312A, 312B of the pivotable plate 112 to prevent the translatable plate 114 from lifting off the pivotable plate 112. Further, the translatable plate 114 includes one or more screw holes 318A, 318B for mounting the plurality of fiber optic splice trays 300A-300F to the translatable plate 114, as explained in more detail below.

The at least one fiber optic module 106 comprises a plurality of fiber optic splice trays 300A-300F which are vertically stacked and fixedly mounted to the translatable plate 114, as explained in more detail below. The translatable plate 114 is translatable relative to the pivotable plate 112 between a closed position and an open position. The translatable plate 114 includes a first front slot 320A (also referred to as a left front slot 320A) and a second front slot 320B (also referred to as a right front slot 320B). Both the left and right front slots 320A, 320B are positioned along a front of the translatable plate 114.

The mount assembly 104 includes a strap 322 positioned within the left or right front slot 320A, 320B. In particular, the strap 322 is used to further secure the fiber optic modules 106 to the mount assembly 104 and to prevent relative movement of the translatable plate 114 relative to the pivotable plate 112. Accordingly, the strap 322 is fed through one of the left or right front slots 320A, 320B underneath the pivotable plate 112, positioned along a back of the pivotable plate 112, translatable plate 114, and the fiber optic modules 106, over a top of the fiber optic modules 106, and along a front of the pivotable plate 112, translatable plate 114, and the fiber optic modules 106. Accordingly, the strap 322 length is adjustable, such that the strap 322 may provide no relative movement when the strap 322 is fully tightened, and may provide limited relative movement when the strap 322 is loosened.

Figure 4A:
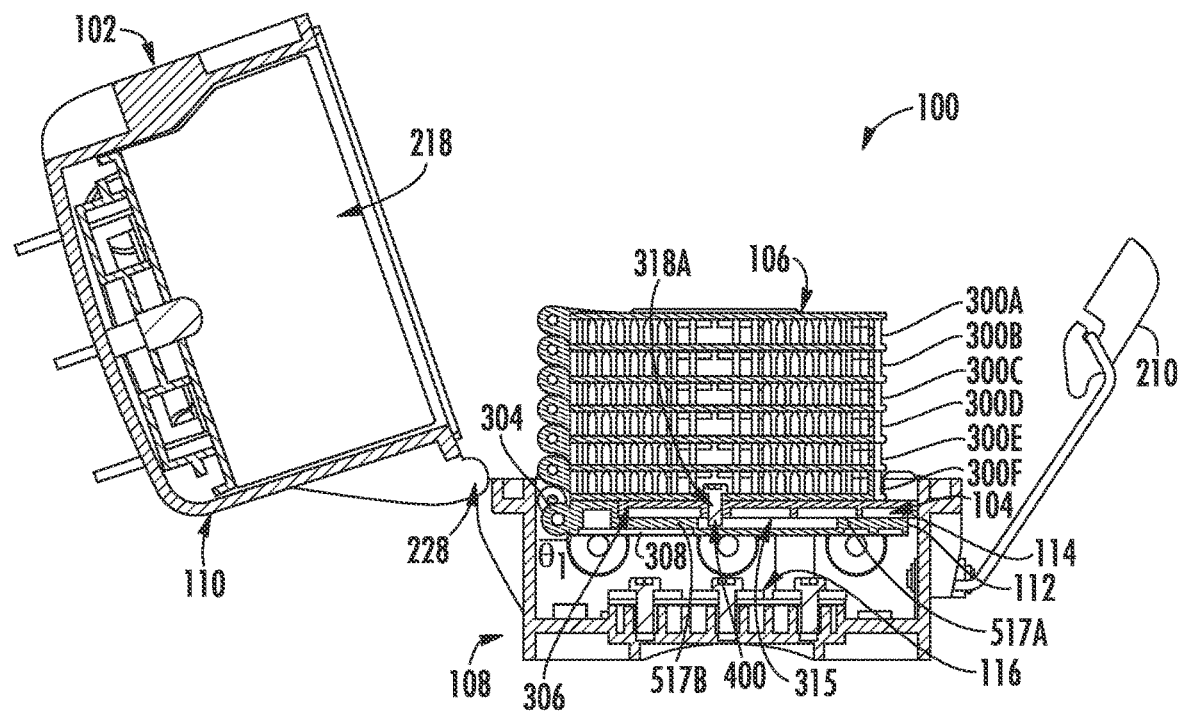
FIG. 4A is a cross-sectional view of the exemplary fiber optic closure terminal of FIGS. 1-3B illustrating a pivotable plate and the translatable plate of the mount assembly in a closed position.

FIGS. 4A-4D are views of the exemplary fiber optic closure terminal 100 illustrating operation of the mount assembly 104. FIG. 4A is a cross-sectional view of the exemplary fiber optic closure terminal 100 illustrating the pivotable plate 112 and the translatable plate 114 of the mount assembly 104 in a closed position. The vertical stack of fiber optic modules 106 are attached to each other. Further, the vertical stack of fiber optic modules 106 are fixedly mounted to the translatable plate 114 by a mounting track screw 400. In particular, the mounting track screw 400 extends through a bottom wall of the fiber optic module 106 at the bottom of the vertical stack, the screw hole 318A of the translatable plate 114, and into the retaining channel 315 of the pivotable plate 112. The retaining channel 315 includes a first wall 517A (also referred to as a front wall) and a second wall 517B (also referred to as a back wall) opposite thereto. In this way, the translatable plate 114 cannot be removed from the recessed channel 306 of the pivotable plate 112 because the mounting track screw 400 contacts and cannot extend past the front wall 517A of the retaining channel 315 of the pivotable plate 112, as explained in more detail below.

In a closed position, the cover 110 is pivotable relative to the base 108 to enclose the fiber optic modules 106 within the housing 102 of the fiber optic closure terminal 100. When the cover 110 is in a closed position, at least a portion of the fiber optic modules 106 are positioned within the interior 218 of the cover 110. When the cover 110 is in a fully open position, and the pivotable plate 112 is in a closed position, no portion of the fiber optic modules 106 is positioned within the interior 218 of the cover 110. Further, when the pivotable plate 112 is in a closed position, the pivotable plate 112 is generally level at a first angle $\Theta_1$ of about 0 degrees, and the pivotable plate 112 and the translatable plate 114 are positioned between the front wall 204A and the back wall 204B of the base 108. Accordingly, when the pivotable plate 112 is in the closed position, the translatable plate 114 may not have sufficient clearance to translate from a closed position to an open position due to interference with the front wall 204A of the base 108. Further, the mounting track screw 400 contacts the back wall 517B of the retaining channel 315.

Figure 4B:
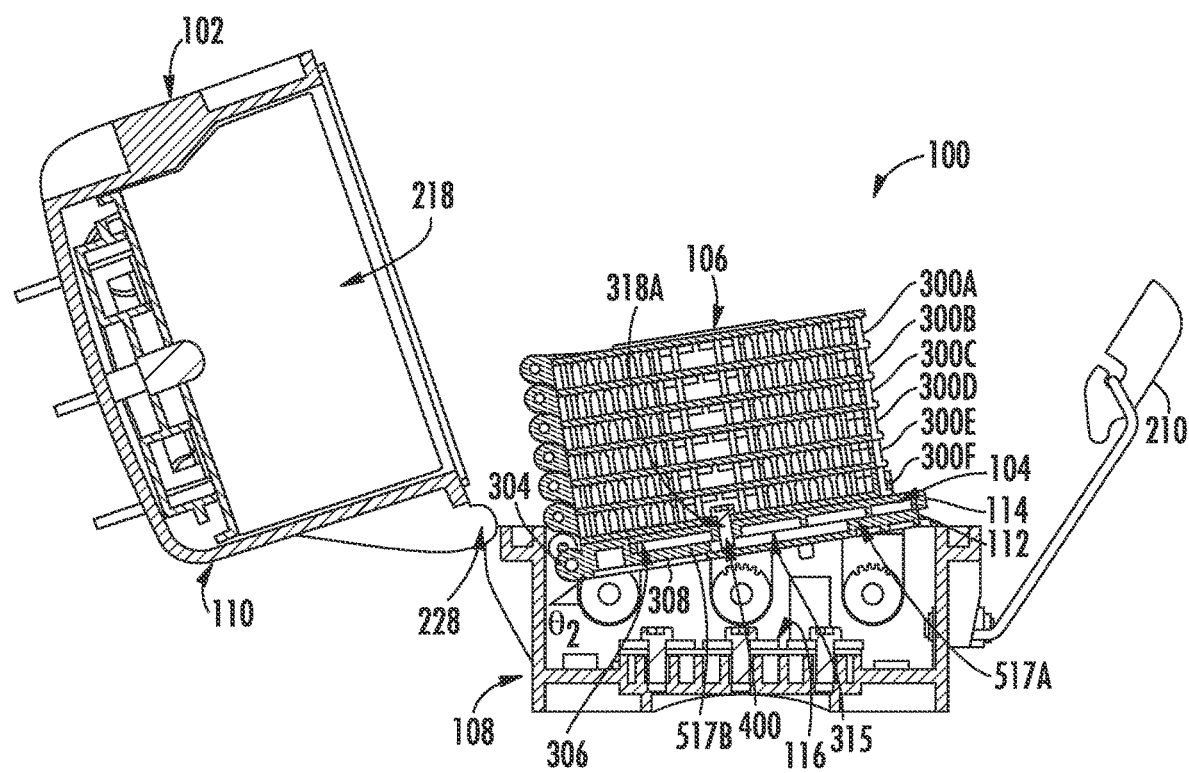
FIG. 4B is a cross-sectional view of the exemplary fiber optic closure terminal of FIG. 4A illustrating the pivotable plate in an open position and the translatable plate in a closed position.

FIG. 4B is a cross-sectional view of the exemplary fiber optic closure terminal 100 illustrating the pivotable plate 112 in an open position and the translatable plate 114 in a closed position. The pivotable plate 112 is rotated upward around the hinge 304 of the pivotable plate 112 until the pivotable plate 112 reaches a second angle $\Theta_2$. At the second angle $\Theta_2$, a back of at least one of the fiber optic modules 106 contacts the back wall 204B of the base 108. At the second angle $\Theta_2$, a front edge of the pivotable plate 112 and a front edge of the translatable plate 114 are positioned above the front wall 204A of the base 108, thereby providing clearance for translation of the translatable plate 114 relative to the pivotable plate 112.

Figure 4C:
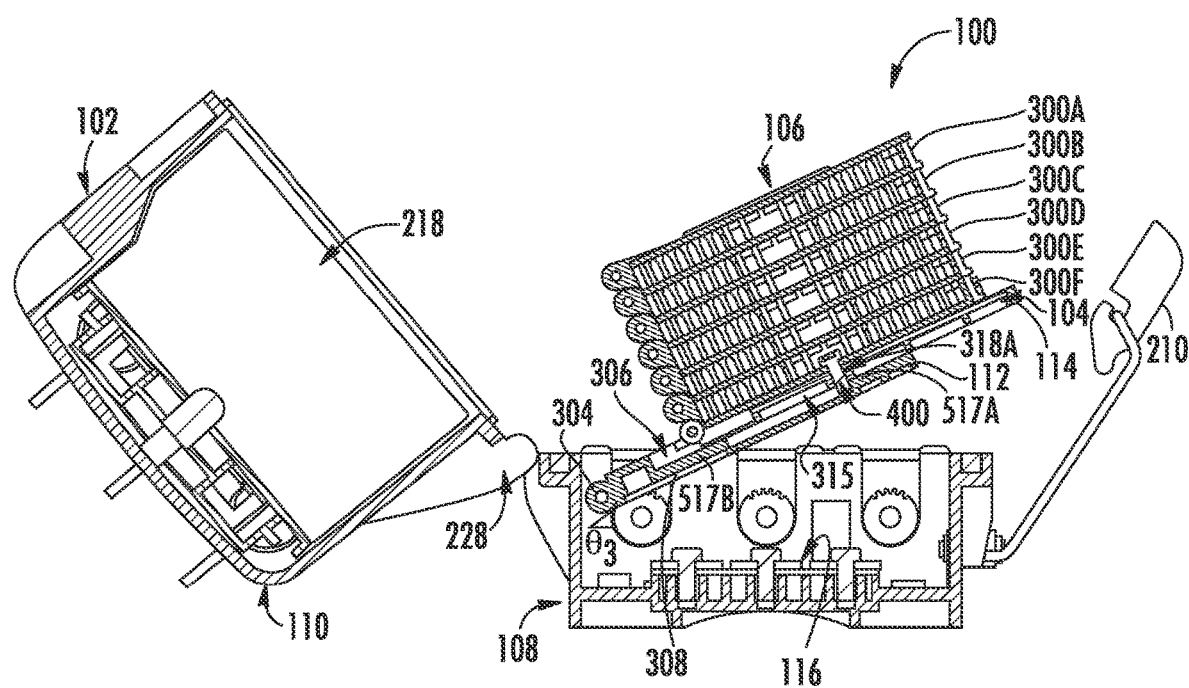
FIG. 4C is a cross-sectional view of the exemplary fiber optic closure terminal of FIGS. 4A and 4B illustrating the pivotable plate and the translatable plate in an open position.

FIG. 4C is a cross-sectional view of the exemplary fiber optic closure terminal 100 illustrating the pivotable plate 112 and the translatable plate 114 in an open position. The pivotable plate 112 is rotated upward around the hinge 304 of the pivotable plate 112 until the pivotable plate 112 reaches a third angle $\Theta_3$. At the third angle $\Theta_3$, the translatable plate 114 extends forward relative to the pivotable plate 112, such that at least a portion of the translatable plate 114 extends over the front wall 204A of the base 108. Translating the translatable plate 114 forward also moves the fiber optic modules 106 forward as well, thereby providing sufficient clearance between the back wall 204B of the base 108 and the back of the fiber optic modules 106 so that the pivotable plate 112 can pivot from the second angle $\Theta_2$ to the third angle $\Theta_3$. The translatable plate 114 is prevented from overextending and accidental removal from the pivotable plate 112 by contact of the mounting track screw 400 with the front wall 517A of the retaining channel 315 of the pivotable plate 112.

Figure 4D:
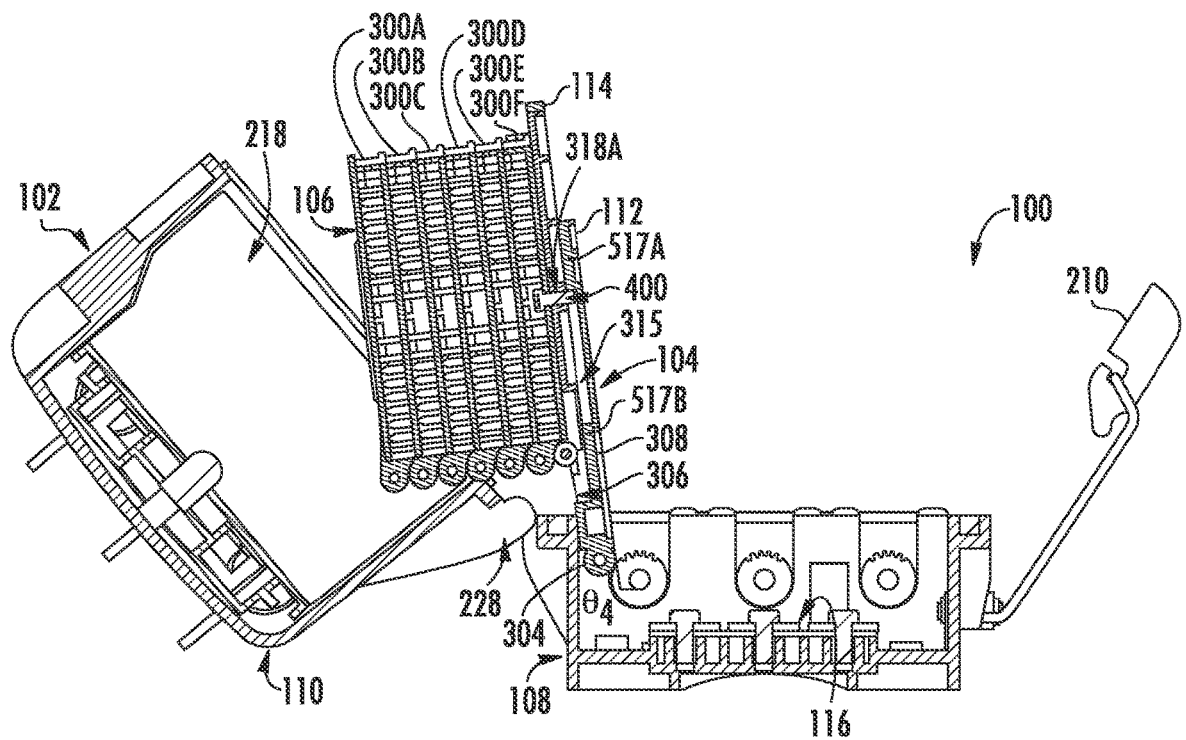
FIG. 4D is a cross-sectional view of the exemplary fiber optic closure terminal of FIGS. 4A-4C illustrating the pivotable plate in an open position greater than ninety degrees.

FIG. 4D is a cross-sectional view of the exemplary fiber optic closure terminal 100 illustrating the pivotable plate 112 and the translatable plate 114 in an open position and fully rotated. When the translatable plate 114 is fully translated forward relative to the pivotable plate 112, the pivotable plate 112 has sufficient room to rotate to a fourth angle $\Theta_4$ greater than ninety degrees from the first angle $\Theta_1$. Accordingly, the pivotable plate 112 contacts a top of the back wall 204B of the base 108 in a fully rotated position. Further, when the pivotable plate 112 and translatable plate 114 are in a fully open position, at least a portion of the fiber optic modules 106 are positioned within the interior 218 of the cover 110. In particular, at least a portion of the pivotable plate 112 and/or the translatable plate 114 are positioned over the hinge 228 of the housing 102. Accordingly, rotation greater than ninety degrees provides increased access to a bottom area of the base 108 of the housing 102, such as to access fiber management features 116 located at a bottom of the base 108 beneath the fiber optic modules 106.

Figure 5A:
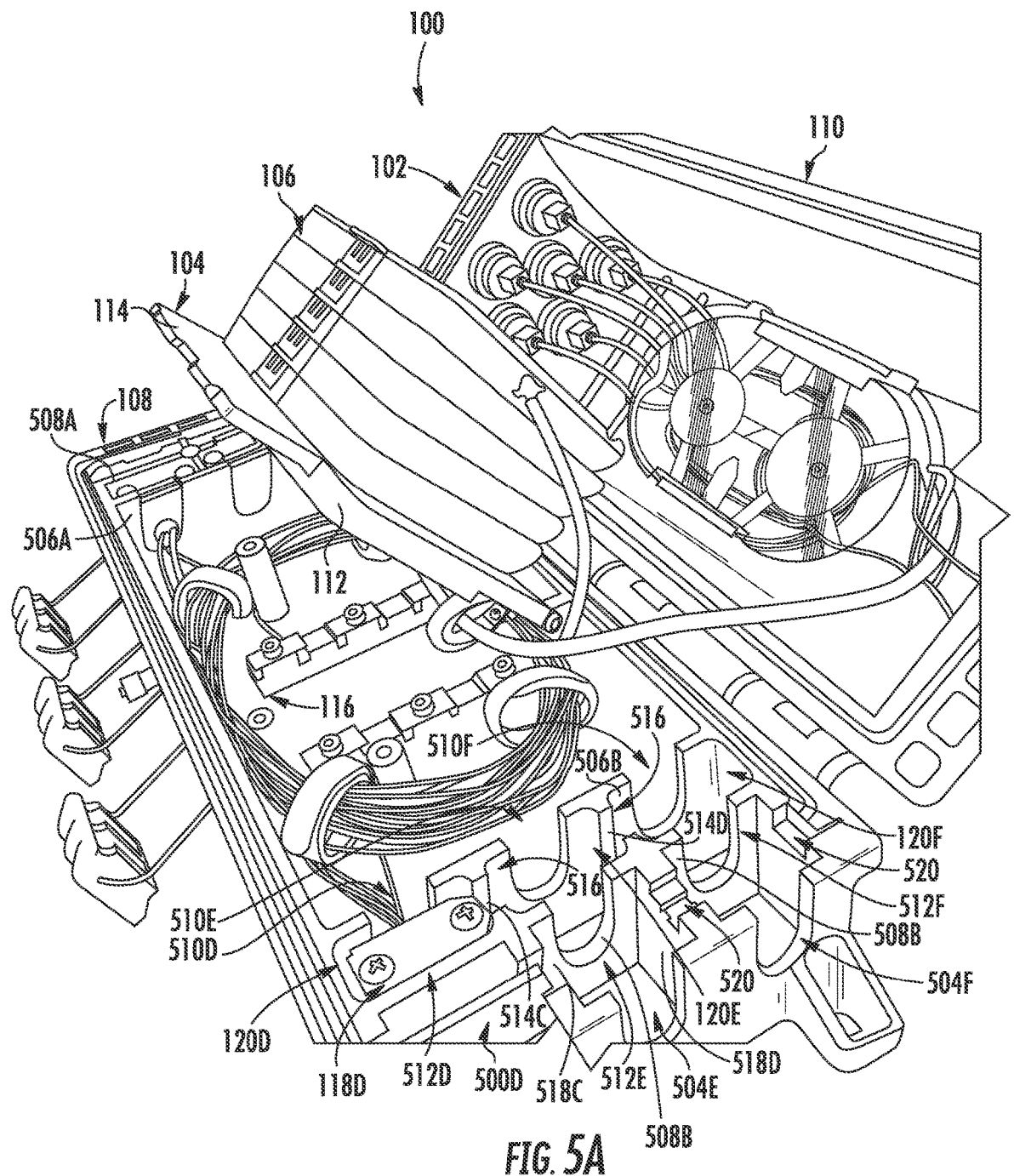
FIG. 5A is a perspective view of the exemplary fiber optic closure terminal of FIGS. 1-4D with the mount assembly in an open position, illustrating removable strain relief assemblies positioned in strain relief receptacles of the base and including removable grommets positioned in grommet receptacles of the base.
Figure 5B:
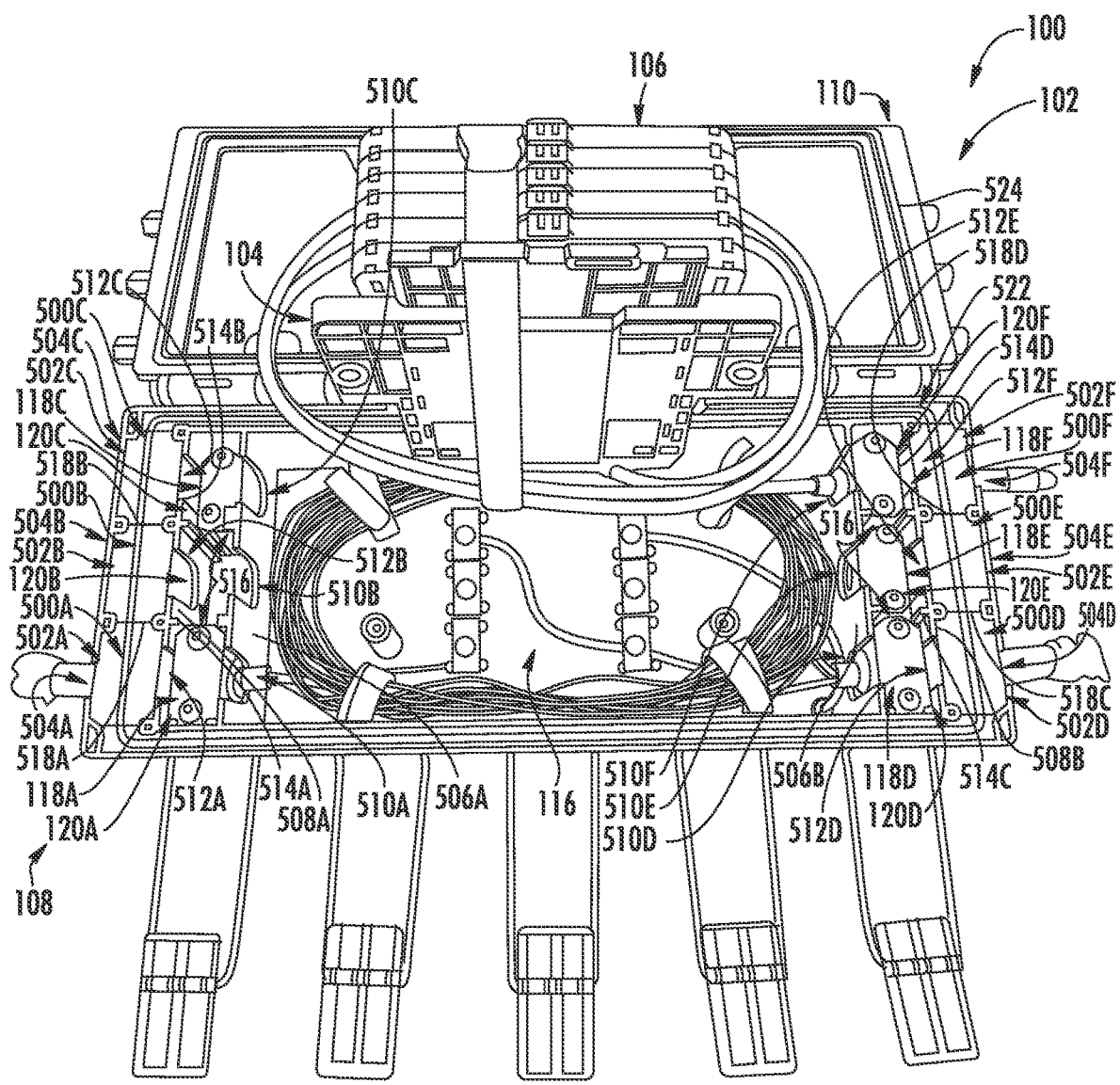
FIG. 5B is a top view of the exemplary fiber optic closure terminal of FIG. 5A.

FIGS. 5A and 5B are views of the exemplary fiber optic closure terminal 100 of FIGS. 1-4D with the mount assembly 104 in an open position, illustrating the removable strain relief assemblies 118A-118F positioned in strain relief receptacles 120A-120F of the base 108 and including removable grommets 500A-500F positioned in grommet receptacles 502A-502F of the base 108.

As mentioned above, the base 108 includes a plurality of feeder ports 208A-208F in the left and right walls 202A, 202B. Further, the left wall 202A of the base 108 includes a first vertical channel 504A extending from a top of the left wall 202A to the first feeder port 208A, a second vertical channel 504B extending from a top of the left wall 202A to the second feeder port 208B, and a third vertical channel 504C extending from a top of the left wall 202A to the third feeder port 208C. The right wall 202B of the base 108 includes a fourth vertical channel 504D extending from a top of the right wall 202B to the fourth feeder port 208D, a fifth vertical channel 504E extending from a top of the right wall 202B to the fifth feeder port 208E, and a sixth vertical channel 504F extending from a top of the right wall 202B to the sixth feeder port 208F. These vertical channels 504A-504F allow a fiber optic cable to be placed into their respective feeder port 208A-208F from the top without requiring the fiber optic cable to be fed through the port 208A-208F.

The base 108 further includes a first medial wall 506A (also referred to as a left medial wall), a second medial wall 506B (also referred to as a right medial wall), a first distal wall 508A (also referred to as a left distal wall 508A), and a second distal wall 508B (also referred to as a right distal wall 508B). The left and right medial walls 506A, 506B and left and right distal walls 508A, 508B form the strain relief receptacles 120A-120F and grommet receptacles 502A-502F, as explained in more detail below.

The left medial wall 506A is positioned towards the left wall 202A of the base 108 and extends from the front wall 204A to the back wall 204B of the base 108. The left distal wall 508A is positioned between the left wall 202A and the left medial wall 506A and extends from the front wall 204A to the back wall 204B of the base 108. The left medial wall 506A includes a first vertical channel 510A extending from a top of the left medial wall 506A, and the left distal wall 508A includes a first vertical channel 512A extending from a top of the left distal wall 508A. The first vertical channel 510A of the left medial wall 506A and the first vertical channel 512A of the left distal wall 508A are generally aligned with the first feeder port 208A and first vertical channel 504A of the left wall 202A. Thus, a cable extending from the interior 218 of the base 108 to an exterior of the base 108 may be positioned within the first vertical channels 504A, 510A, 512A from above. The left medial wall 506A further includes a second vertical channel 510B and third vertical channel 510C, and the left distal wall 508A further includes a second vertical channel 512B and third vertical channel 512C, which are similarly aligned with the second vertical channel 504B and third vertical channel 504C of the left wall 202A.

The plurality of strain relief receptacles 120A-120C is defined between the left medial wall 506A and the left distal wall 508A. In particular, the base 108 includes a plurality of receptacle dividers 514A, 514B (also referred to as receptacle walls, transverse walls, etc.) to define and separate the strain relief receptacles 120A-120C. In particular, the base 108 includes a first receptacle divider 514A extending between the left medial wall 506A and the left distal wall 508A and positioned towards the front wall 204A of the base 108. The base 108 also includes a second receptacle divider 514B extending between the left medial wall 506A and the left distal wall 508A and positioned towards the back wall 204B of the base 108. Each of the first and second receptacle dividers 514A, 514B may define a gap 516, which extends from the top of the left medial wall 506A and left distal wall 508A.

Accordingly, each of the first, second, and third strain relief receptacles 120A-120C are defined by the left medial wall 506A and the left distal wall 508A, where the first strain relief receptacle 120A is separated from the second strain relief receptacle 120B by the first receptacle divider 514A, and the second strain relief receptacle 120B is separated from the third strain relief receptacle 120C by the second receptacle divider 514B.

The plurality of grommet receptacles 502A-502C is defined between the left wall 202A and the left distal wall 508A. In particular, the base 108 includes a plurality of receptacle dividers 518A, 518B (also referred to as receptacle walls, transverse walls, etc.) to define and separate the grommet receptacles 502A-502C. In particular, the base 108 includes a first receptacle divider 518A extending between the left wall 202A and the left distal wall 508A and positioned towards the front wall 204A of the base 108. The base 108 also includes a second receptacle divider 518B extending between the left medial wall 506A and the left distal wall 508A and positioned towards the back wall 204B of the base 108. Each of the first and second receptacle dividers 518A, 518B may define a recess 520, which extends from the top of the left wall 202A and left distal wall 508A.

Accordingly, each of the first, second, and third grommet receptacles 502A-502C are defined by the left wall 202A and the left distal wall 508A, where the first grommet receptacle 502A is separated from the second grommet receptacle 502B by the first receptacle divider 518A, and the second grommet receptacle 502B is separated from the third grommet receptacle 502C by the second receptacle divider 518B.

The right medial wall 506B is positioned towards the right wall 202B of the base 108 and extends from the front wall 204A to the back wall 204B of the base 108. The right distal wall 508B is positioned between the right wall 202B and the right medial wall 506B and extends from the front wall 204A to the back wall 204B of the base 108. The right medial wall 506B includes a fourth vertical channel 510D extending from a top of the right medial wall 506B, and the right distal wall 508B includes a fourth vertical channel 512D extending from a top of the right distal wall 508B. The fourth vertical channel 510D of the right medial wall 506B and the fourth vertical channel 512D of the right distal wall 508B are generally aligned with the fourth feeder port 208D and fourth vertical channel 504D of the right wall 202B. Thus, a cable extending from the interior 218 of the base 108 to an exterior of the base 108 may be positioned within the fourth vertical channels 504D, 510D, 512D from above. The right medial wall 506B further includes a fifth vertical channel 510E and sixth vertical channel 510F, and the right distal wall 508B further includes a fifth vertical channel 512E and sixth vertical channel 512F, which are similarly aligned with the fifth vertical channel 504E and sixth vertical channel 504F of the right wall 202B.

The plurality of strain relief receptacles 120D-120F are defined between the right medial wall 506B and the right distal wall 508B. In particular, the base 108 includes a plurality of receptacle dividers 514C, 514D (also referred to as receptacle walls, transverse walls, etc.) to define and separate the strain relief receptacles 120D-120F. In particular, the base 108 includes a third receptacle divider 514C extending between the right medial wall 506B and the right distal wall 508B and positioned towards the front wall 204A of the base 108. The base 108 also includes a fourth receptacle divider 514D extending between the right medial wall 506B and the right distal wall 508B and positioned towards the back wall 204B of the base 108. Each of the third and fourth receptacle dividers 514C, 514D may define a gap 516, which extends from the top of the right medial wall 506B and right distal wall 508B.

Accordingly, each of the fourth, fifth, and sixth strain relief receptacles 120D-120F are defined by the right medial wall 506B and the right distal wall 508B, where the fourth strain relief receptacle 120D is separated from the fifth strain relief receptacle 120E by the third receptacle divider 514C, and the fifth strain relief receptacle 120E is separated from the sixth strain relief receptacle 120F by the fourth receptacle divider 514D.

The plurality of grommet receptacles 502D-502F are defined between the right wall 202B and the right distal wall 508B. In particular, the base 108 includes a plurality of receptacle dividers 518C, 518D (also referred to as receptacle walls, transverse walls, etc.) to define and separate the grommet receptacles 502D-502F. In particular, the base 108 includes a third receptacle divider 518C extending between the right wall 202B and the right distal wall 508B and positioned towards the front wall 204A of the base 108. The base 108 also includes a fourth receptacle divider 518D extending between the right medial wall 506B and the right distal wall 508B and positioned towards the back wall 204B of the base 108. Each of the third and fourth receptacle dividers 518C, 518D may define a recess 520, which extends the top of the right wall 202B and right distal wall 508B.

Accordingly, each of the fourth, fifth, and sixth grommet receptacles 502D-502F are defined by the right wall 202B and the right distal wall 508B, where the fourth grommet receptacle 502D is separated from the fifth grommet receptacle 502E by the third receptacle divider 518C, and the fifth grommet receptacle 502E is separated from the sixth grommet receptacle 502F by the fourth receptacle divider 518D.

In this way, each of the removable strain relief assemblies 118A-118F may be attached to a fiber optic cable outside and independent of the housing 102 to enable installation flexibility and versatility. For example, a removable strain relief assembly 118A could be attached to a fiber optic cable and/or a first removable grommet 500A could be attached to the fiber optic cable outside of the base 108. The fiber optic cable may then be positioned within the first vertical channels 504A, 510A, 512A, the removable strain relief assembly 118A may be placed in the first strain relief receptacle 120A (while remaining attached to the fiber optic cable) and the first removable grommet 500A may be placed in the first grommet receptacle 502A (while remaining attached to the fiber optic cable). This provides greater flexibility for an operator installing a fiber optic cable within the fiber optic closure terminal 100 and facilitates ease of installation and maintenance of the fiber optic closure terminal 100.

Further, when the removable grommets 500A-500F are positioned within their respective grommet receptacles 502A-502F, the grommets 500A-500F at least partially form a gasket mounting surface 522 extending around a peripheral edge of the base 108. The gasket mounting surface 522 is configured in size and shape to mate with a gasket 524 positioned around a peripheral edge of the cover 110.

FIGS. 6A-6E are views of a removable strain relief assembly 118A of the exemplary fiber optic closure terminal 100 of FIGS. 1-5B. The removable strain relief assembly 118A includes the first strain relief support 122 (also referred to as a bottom strain relief support) and the second strain relief support 124 (also referred to as a top strain relief support). The bottom strain relief support 122 and the top strain relief support 124 translate relative to one another to secure a fiber optic cable therein, as explained below.

Figure 6A:
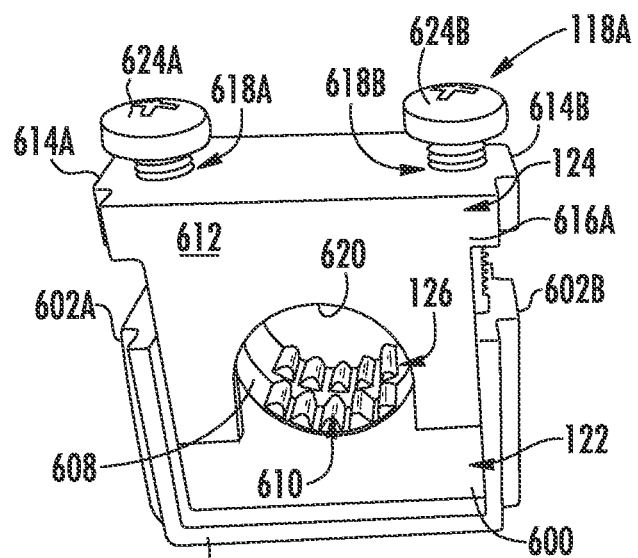
FIG. 6A is a perspective view of a removable strain relief assembly of the exemplary fiber optic closure terminal of FIGS. 1-5B.
Figure 6B:
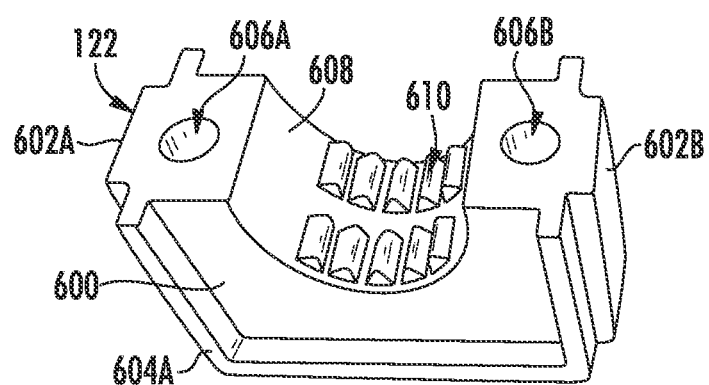
FIG. 6B is a top perspective view of a bottom strain relief support of the removable strain relief assembly of FIG. 6A.
Figure 6C:
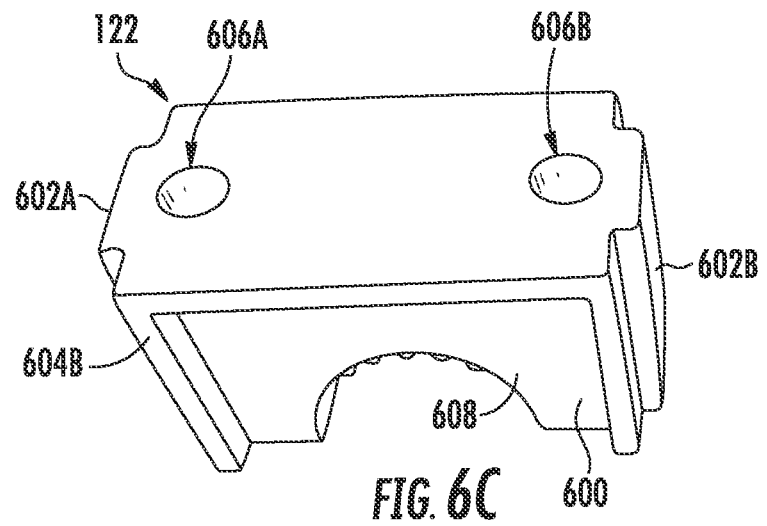
FIG. 6C is a bottom perspective view of the bottom strain relief support of FIG. 6B.

Referring to FIGS. 6A-6C, the bottom strain relief support 122 includes a body 600, a first rail 602A (also referred to as a left rail) vertically positioned along a left side of the body 600, and a second rail 602B (also referred to as a right rail) vertically positioned along a right side of the body 600 opposite the left rail 602A. The left and right rails 602A, 602B secure and/or align the removable strain relief assembly 118A within one of the strain relief receptacles 120A-120F (shown in FIGS. 1, 2B, 3A, 3B, 5A, and 5B). The bottom strain relief support 122 includes a first lip 604A (also referred to as a front lip) extending along at least a portion of a peripheral edge of a front surface of the body 600 and a second lip 604B (also referred to as a back lip) opposite the front lip 604A and extending along at least a portion of a peripheral edge of a back surface of the body 600. The front and back lips 604A, 604B guide relative movement and retain the top strain relief support 124 relative to the bottom strain relief support 122.

The bottom strain relief support 122 further includes a first threaded screw hole 606A (also referred to as a left threaded screw hole) proximate a left side of the body 600 and a second threaded screw hole 606B (also referred to as a right threaded screw hole) proximate a right side of the body 600 opposite the left threaded screw hole 606A. The left and right threaded screw holes 606A, 606B receive a fastener therein to secure the bottom strain relief support 122 to the top strain relief support 124, as discussed in more detail below. The bottom strain relief support 122 further includes a first arced surface 608 (also referred to as a bottom arced surface) defined at a top of the bottom strain relief support 122 between the left and right threaded screw holes 606A, 606B. The bottom arced surface 608 includes a plurality of longitudinal ribs 610 extending between a front side and a back side of the body 600 and circumferentially positioned along the bottom arced surface 608. The longitudinal ribs 610 frictionally engage an outer surface of the fiber optic cable positioned therein.

Figure 6D:
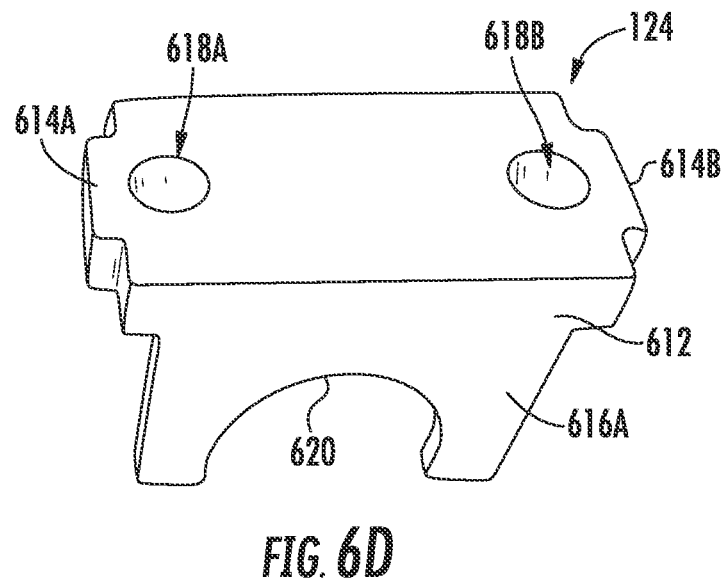
FIG. 6D is a top perspective view of a top strain relief support of the removable strain relief assembly of FIG. 6A.
Figure 6E:
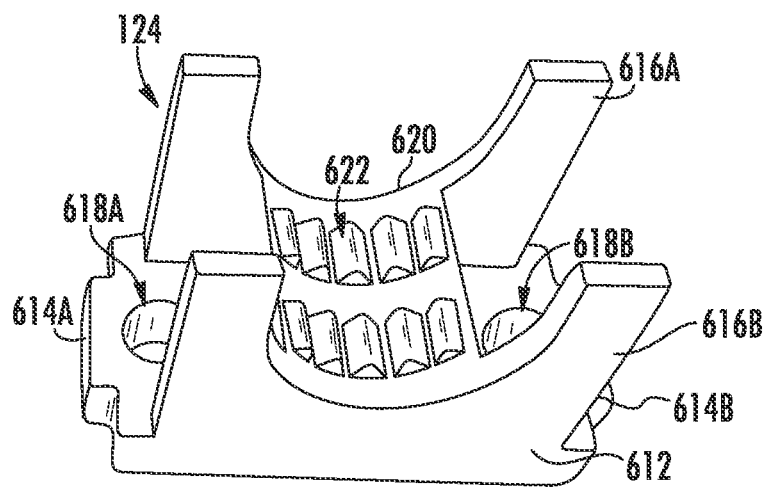
FIG. 6E is a bottom perspective view of the top strain relief support of FIG. 6D.

Referring to FIGS. 6A, 6D and 6E, the top strain relief support 124 includes a body 612, a first rail 614A (also referred to as a left rail 614A) positioned along a left side of the body 612 at a top thereof, and a second rail 614B (also referred to as a right rail 614B) positioned along a right side of the body 612 at a top thereof opposite the left rail 614A. The left and right rails 614A, 614B secure and/or align the removable strain relief assembly 118A within one of the strain relief receptacles 120A-120F (shown in FIGS. 1, 2B, 3A, 3B, 5A, and 5B). The left and right rails 614A, 614B of the top strain relief support 124 align with the left and right rails 602A, 602B of the bottom strain relief support 122 when the bottom strain relief support 122 and top strain relief support 124 are assembled together. The top strain relief support 124 includes a first wall 616A (also referred to as a front wall) and a second wall 616B (also referred to as a back wall) opposite the front wall 616A. When the bottom strain relief support 122 and the top strain relief support 124 are assembled to one another, the front wall 616A of the top strain relief support 124 fits within the front lip 604A of the bottom strain relief support 122, and the back wall 616B of the top strain relief support 124 fits within the back lip 604B of the bottom strain relief support 122. In this way, the front and back lips 604A, 604B of the bottom strain relief support 122 horizontally align the top strain relief support 124 relative to the bottom strain relief support 122 (in the left and right direction). Further, the front wall 616A and the back wall 616B are configured relative to one another to receive at least a portion of the body 600 of the bottom strain relief support 122 therebetween. Accordingly, the front and back walls 616A, 616B of the top strain relief support 124 horizontally align the top strain relief support 124 relative to the bottom strain relief support 122 (in the front and back direction).

The top strain relief support 124 further includes a first through hole 618A (also referred to as a left through hole) proximate a left side of the body 612 and a second through hole 618B (also referred to as a right through hole) proximate a right side of the body 612 opposite the left through hole 618A. Accordingly, when bottom strain relief support 122 and the top strain relief support 124 are assembled together, the left and right threaded screw holes 606A, 606B of the bottom strain relief support 122 are aligned, respectively, with the left and right through holes 618A, 618B of the top strain relief support 124 to receive a fastener therethrough, as explained in more detail below.

The top strain relief support further includes a second arced surface 620 (also referred to as a top arced surface 620) defined in a bottom of the top strain relief support 124 between the left and right through holes 618A, 618B and extending from a front side to a back side of the body 612 of the top strain relief support 124. The top arced surface 620 includes a plurality of longitudinal ribs 622 extending between a front side and a back side of the body 612 and circumferentially positioned along the top arced surface 620. The longitudinal ribs 622 frictionally engage an outer surface of the fiber optic cable positioned therein.

The removable strain relief assembly 118A further includes a first screw 624A (also referred to as a left screw) and a second screw 624B (also referred to as a right screw). When the bottom strain relief support 122 and top strain relief support 124 are assembled together, the left screw 624A is positioned through the left through hole 618A of the top strain relief support 124 and into the left threaded screw hole 606A of the bottom strain relief support 122, and the right screw 624B is positioned through the right through hole 618B of the top strain relief support 124 and into the right threaded screw hole 606B of the bottom strain relief support 122.

When assembled, the bottom arced surface 608 of the bottom strain relief support 122 and the top arced surface 620 of the top strain relief support 124 define the adjustable aperture 126 to receive one of a variety of sized fiber optic cables. In particular, a fiber optic cable can be fed through the assembled removable strain relief assembly 118A such that the fiber optic cable is positioned within the adjustable aperture 126, or the removable strain relief assembly 118A may be assembled around the fiber optic cable such that the fiber optic cable is positioned within the adjustable aperture 126. The fiber optic cable is then secured within the adjustable aperture 126 by tightening the left and right screws 624A, 624B. Other types of fasteners could be used, and more or fewer screws could be used. An advantage of having left and right screws 624A, 624B is that it levels the pressure across the fiber optic cable.

As discussed above, when the removable grommets 500A-500F are positioned within their respective grommet receptacles 502A-502F, the grommets 500A-500F at least partially form a gasket mounting surface 522 extending around a peripheral edge of the base 108. The gasket mounting surface 522 is configured in size and shape to mate with a gasket 524 positioned around a peripheral edge of the cover 110.

Figure 7:
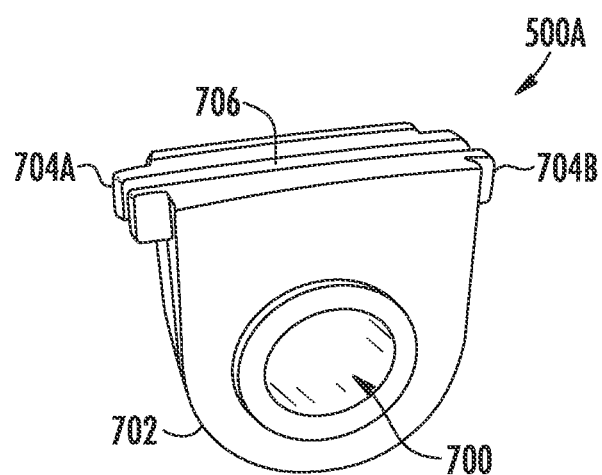
FIG. 7 is a perspective view of a grommet of the exemplary fiber optic closure terminal of FIGS. 1-6E.

FIG. 7 is a perspective view of a removable grommet 500A of the exemplary fiber optic closure terminal 100 of FIGS. 1-6E. The removable grommet 500A defines a central aperture 702 to receive a fiber optic cable therethrough. The removable grommet 500A further includes a rounded bottom 702 to facilitate insertion of the grommet 500A into the grommet receptacle 502A of the base 108 of the housing 102 (shown in FIGS. 5A and 5B). The removable grommet 500A further includes a first wing 704A (also referred to as a left wing) at a top of the grommet 500A and a second wing 704B (also referred to as a right wing) opposite the left wing 704A at a top of the grommet 500A. A sealing groove 706 is defined in the top of the grommet 500A and extends between a left side and a right side of the grommet 500A. The sealing groove 706 forms the gasket mounting surface 522 described above. Accordingly, when the removable grommets 500A-500F are positioned within their respective receptacles 502A-502F, the removable grommets 500A-500F form a continuous gasket mounting surface 522 extending across the removable grommets 500A-500F. Thus, for example, the left wing 704A of the removable grommet 500B is adjacent to the right wing 704B of the removable grommet 500A.

Figure 8:
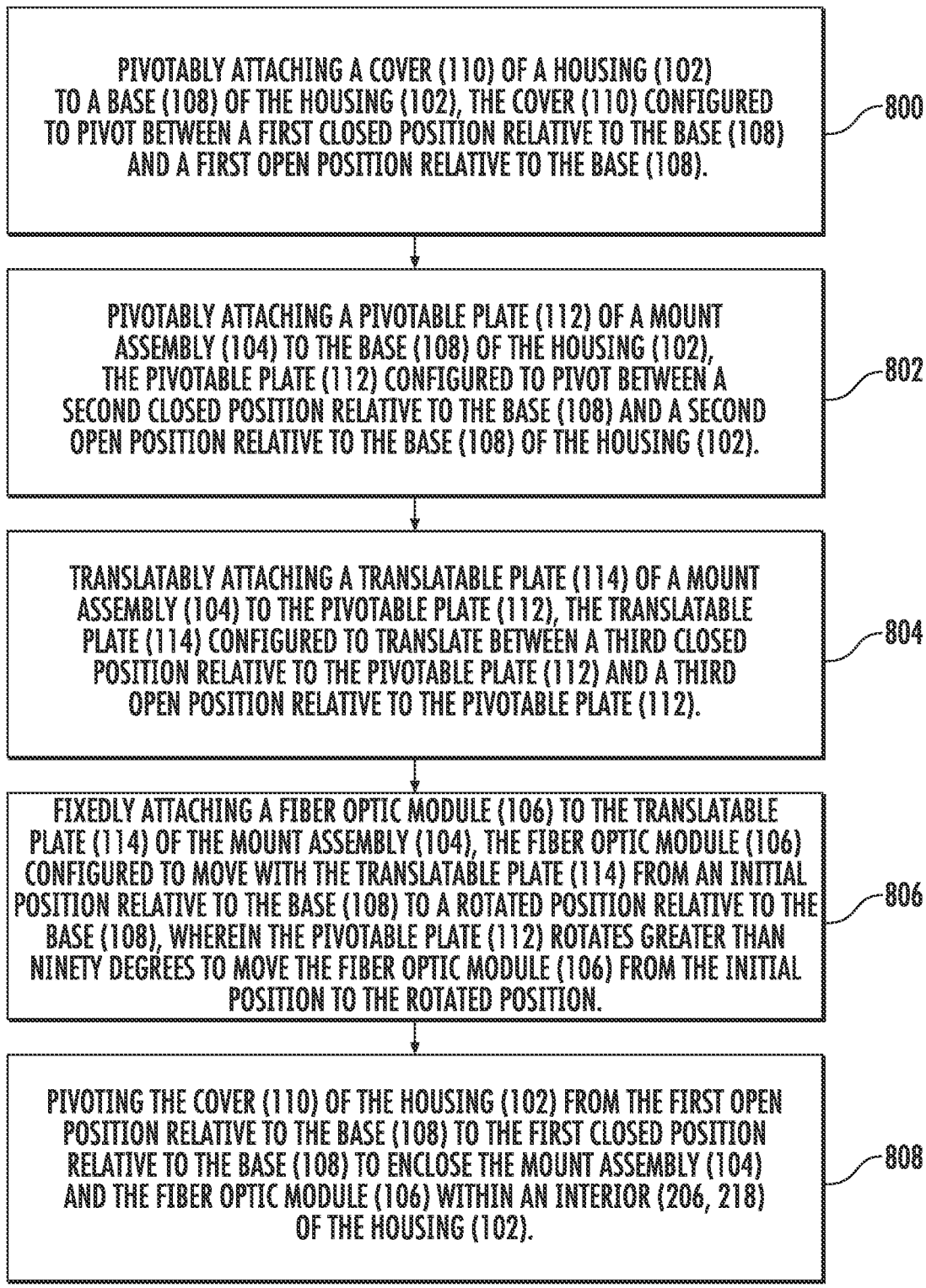
FIG. 8 is a flowchart illustrating an exemplary process that can be employed to manufacture the fiber optic closure terminal of FIGS. 1-7.

FIG. 8 is a flowchart illustrating an exemplary process that can be employed to manufacture the fiber optic closure terminal 100 of FIGS. 1-7. Step 800 includes pivotably attaching a cover 110 of a housing 102 to a base 108 of the housing 102, the cover 110 configured to pivot between a first closed position relative to the base 108 and a first open position relative to the base 108. Step 802 includes pivotably attaching a pivotable plate 112 of a mount assembly 104 to the base 108 of the housing 102, the pivotable plate 112 configured to pivot between a second closed position relative to the base 108 and a second open position relative to the base 108 of the housing 102. Step 804 includes translatably attaching a translatable plate 114 of a mount assembly 104 to the pivotable plate 112, the translatable plate 114 configured to translate between a third closed position relative to the pivotable plate 112 and a third open position relative to the pivotable plate 112. Step 806 includes fixedly attaching a fiber optic module 106 to the translatable plate 114 of the mount assembly 104, the fiber optic module 106 configured to move with the translatable plate 114 from an initial position relative to the base 108 to a rotated position relative to the base 108, wherein the pivotable plate 112 rotates greater than ninety degrees to move the fiber optic module 106 from the initial position to the rotated position. Step 808 includes pivoting the cover 110 of the housing 102 from the first open position relative to the base 108 to the first closed position relative to the base 108 to enclose the mount assembly 104 and the fiber optic module 106 within an interior 206, 218 of the housing 102.

Figure 9:
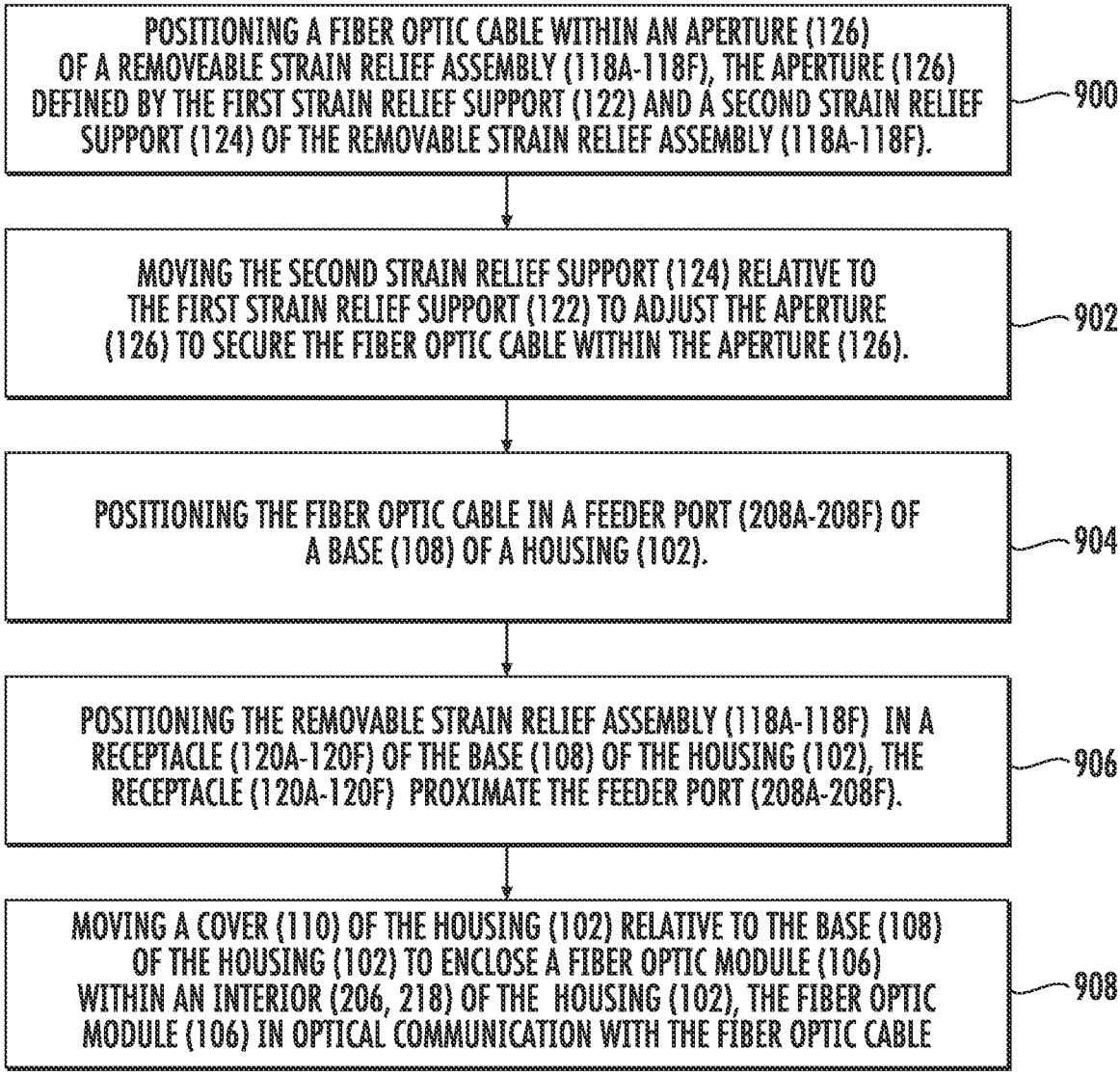
FIG. 9 is a flowchart illustrating another exemplary process that can be employed to manufacture the fiber optic closure terminal of FIGS. 1-7.

FIG. 9 is a flowchart illustrating another exemplary process that can be employed to manufacture the fiber optic closure terminal 100 of FIGS. 1-7. Step 900 includes positioning a fiber optic cable within the aperture 126 of the removable strain relief assembly 118A-118F, the aperture 126 defined by the first strain relief support 122 and the second strain relief support 124 of the removable strain relief assembly 118A-118F. Step 902 includes moving (e.g., translating) the second strain relief support 124 relative to the first strain relief support 122 to adjust the aperture 126 to secure the fiber optic cable within the aperture 126. Step 904 includes positioning the fiber optic cable in a feeder port 208A-208F of the base 108 of the housing 102. Step 906 includes positioning the removable strain relief assembly 118A-118F in a receptacle 120A-120F of the base 108 of the housing 102, the receptacle 120A-120F proximate the feeder port 208A-208F. Step 908 includes moving the cover 110 of the housing 102 relative to the base 108 of the housing 102 to enclose a fiber optic module 106 within an interior 206, 218 of the housing 102, the fiber optic module 106 in optical communication with the fiber optic cable.

It will be apparent to those skilled in the art that various modifications and variations can be made without departing from the spirit or scope of the invention.

Further, as used herein, it is intended that terms "fiber optic cables" and/or "optical fibers" include all types of single mode and multi-mode light waveguides, including one or more optical fibers that may be upcoated, colored, buffered, ribbonized and/or have other organizing or protective structure in a cable such as one or more tubes, strength members, jackets or the like. Likewise, other types of suitable optical fibers include bend-insensitive optical fibers, or any other expedient of a medium for transmitting light signals. An example of a bend-insensitive, or bend resistant, optical fiber is ClearCurve® Multimode fiber commercially available from Corning Incorporated. Suitable fibers of this type are disclosed, for example, in U.S. Patent Application Publication Nos. 2008/0166094 and 2009/0169163.

Many modifications and other embodiments of the embodiments set forth herein will come to mind to one skilled in the art to which the embodiments pertain having the benefit of the teachings presented in the foregoing descriptions and the associated drawings. Therefore, it is to be understood that the description and claims are not to be limited to the specific embodiments disclosed and that modifications and other embodiments are intended to be included within the scope of the appended claims. It is intended that the embodiments cover the modifications and variations of the embodiments provided they come within the scope of the appended claims and their equivalents. Although specific terms are employed herein, they are used in a generic and descriptive sense only and not for purposes of limitation.

What is claimed is:

1. A fiber optic closure terminal, comprising:
    a housing defining an interior, the housing comprising a base and a cover pivotably attached to the base, the cover configured to pivot between a first closed position relative to the base and a first open position relative to the base;
    a mount assembly positioned within the interior of the housing, the mount assembly comprising:
        a pivotable plate pivotally attached to the base of the housing, the pivotable plate configured to pivot between a second closed position relative to the base and a second open position relative to the base; and
        a translatable plate translatably attached to the pivotable plate, the translatable plate configured to translate between a third closed position relative to the pivotable plate and a third open position relative to the pivotable plate; and
    a fiber optic module mounted to the translatable plate, the fiber optic module movable with the translatable plate from an initial position relative to the base to a rotated position relative to the base, wherein the pivotable plate rotates greater than ninety degrees to move the fiber optic module from the initial position to the rotated position,
    wherein the pivotable plate is configured to rotate greater than ninety degrees from the second closed position only when the translatable plate is in the third open position.

2. The fiber optic closure terminal of claim 1, wherein the mount assembly is enclosed within the interior of the housing when the cover is in the first closed position.

3. The fiber optic closure terminal of claim 1, wherein the translatable plate is configured such that when the pivotable plate is in the second closed position, the translatable plate is positioned within an interior of the base proximate a wall of the base to prevent the translatable plate from translating from the third closed position to the third open position.

4. The fiber optic closure terminal of claim 3, wherein the translatable plate is configured such that when the pivotable plate is in the second open position, at least a portion of the translatable plate is positioned outside the interior of the base and nonadjacent the wall of the base to allow the translatable plate to translate from the third closed position to the third open position.

5. The fiber optic closure terminal of claim 1, wherein the interior comprises a cover interior and a base interior, wherein at least a portion of the fiber optic module is positioned within the cover interior when the pivotable plate is in the second open position.

6. The fiber optic closure terminal of claim 1, wherein the base comprises a first wall, wherein the cover and the pivotable plate are pivotally attached to the first wall.

7. The fiber optic closure terminal of claim 1, wherein the fiber optic module comprises a plurality of stacked fiber optic splice trays.

8. The fiber optic closure terminal of claim 1, wherein the base comprises a plurality of feeder ports and the cover comprises a plurality of drop ports.

9. A fiber optic closure terminal, comprising:
a housing defining an interior, the housing comprising a base and a cover pivotably attached to the base, the cover configured to pivot between a first closed position relative to the base and a first open position relative to the base;
a mount assembly positioned within the interior of the housing, the mount assembly comprising:
a pivotable plate pivotally attached to the base of the housing, the pivotable plate configured to pivot between a second closed position relative to the base and a second open position relative to the base; and
a translatable plate translatably attached to the pivotable plate, the translatable plate configured to translate between a third closed position relative to the pivotable plate and a third open position relative to the pivotable plate; and
a fiber optic module mounted to the translatable plate, the fiber optic module movable with the translatable plate from an initial position relative to the base to a rotated position relative to the base, wherein the pivotable plate rotates greater than ninety degrees to move the fiber optic module from the initial position to the rotated position, and wherein the pivotable plate comprises a recessed channel and the translatable plate is translatable within the recessed channel.

10. The fiber optic closure terminal of claim 9, wherein the pivotable plate further comprises a track in the recessed channel, and the translatable plate comprises a rail slidably engaged with the track.

11. The fiber optic closure terminal of claim 9, wherein the mount assembly is enclosed within the interior of the housing when the cover is in the first closed position.

12. The fiber optic closure terminal of claim 9, wherein the translatable plate is configured such that when the pivotable plate is in the second closed position, the translatable plate is positioned within an interior of the base proximate a wall of the base to prevent the translatable plate from translating from the third closed position to the third open position.

13. The fiber optic closure terminal of claim 12, wherein the translatable plate is configured such that when the pivotable plate is in the second open position, at least a portion of the translatable plate is positioned outside the interior of the base and nonadjacent the wall of the base to allow the translatable plate to translate from the third closed position to the third open position.

14. The fiber optic closure terminal of claim 9, wherein the interior comprises a cover interior and a base interior, wherein at least a portion of the fiber optic module is positioned within the cover interior when the pivotable plate is in the second open position.

15. The fiber optic closure terminal of claim 9, wherein the base comprises a first wall, wherein the cover and the pivotable plate are pivotally attached to the first wall.

16. The fiber optic closure terminal of claim 9, wherein the fiber optic module comprises a plurality of stacked fiber optic splice trays.

17. The fiber optic closure terminal of claim 9, wherein the base comprises a plurality of feeder ports and the cover comprises a plurality of drop ports.

* * * * *